(12) United States Patent
Magario et al.

(10) Patent No.: US 7,758,962 B2
(45) Date of Patent: *Jul. 20, 2010

(54) COMPOSITE METAL MATERIAL AND METHOD OF PRODUCING THE SAME, CALIPER BODY, BRACKET, DISK ROTOR, DRUM, AND KNUCKLE

(75) Inventors: Akira Magario, Nagano-ken (JP); Toru Noguchi, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/219,707

(22) Filed: Sep. 7, 2005

(65) Prior Publication Data
US 2006/0057387 A1    Mar. 16, 2006

(30) Foreign Application Priority Data
Sep. 10, 2004    (JP) .............................. 2004-264720

(51) Int. Cl.
B32B 9/00    (2006.01)
(52) U.S. Cl. ...................................... 428/408; 428/698
(58) Field of Classification Search ................. 428/408; 164/97; 423/445 R; 977/742
See application file for complete search history.

(56) References Cited

U.S. PATENT DOCUMENTS

| | | | |
|---|---|---|---|
| 4,069,181 A | | 1/1978 | Healy et al. |
| 4,132,828 A | * | 1/1979 | Nakamura et al. .......... 428/366 |
| 4,438,004 A | | 3/1984 | Myers |
| 4,818,633 A | | 4/1989 | Dinwoodie et al. |
| 4,889,774 A | | 12/1989 | Fukizawa et al. |
| 5,458,181 A | * | 10/1995 | Corbett et al. ................. 164/97 |
| 5,705,008 A | * | 1/1998 | Hecht ......................... 156/148 |
| 6,660,371 B1 | * | 12/2003 | Westphal et al. ............ 428/216 |
| 2004/0241440 A1 | | 12/2004 | Noguchi et al. |
| 2005/0075443 A1 | * | 4/2005 | Noguchi et al. ............. 524/495 |
| 2006/0165988 A1 | * | 7/2006 | Chiang et al. ............ 428/402.2 |

FOREIGN PATENT DOCUMENTS

| | | |
|---|---|---|
| GB | 2 119 874 A | 11/1983 |
| JP | A 10-183269 | 7/1998 |
| KR | A-1998-0009490 | 4/1998 |
| WO | WO 2004/059663 A1 | 7/2004 |

OTHER PUBLICATIONS

Noguchi et al (Materials Transactions, Article XP008051208, published Feb. 2004., presented Sep. 24, 2003).*

(Continued)

*Primary Examiner*—David R Sample
*Assistant Examiner*—Daniel Miller
(74) *Attorney, Agent, or Firm*—Oliff & Berridge, PLC

(57) ABSTRACT

A composite metal material includes a carbon-based material in a matrix of a metal-based material. The carbon-based material has a first bonding structure in which an element X bonds to a carbon atom on a surface of a carbon material. The matrix includes an amorphous peripheral phase containing aluminum, nitrogen, and oxygearound the carbon-based material. The element X includes at least one element selected from boron, nitrogen, oxygen, and phosphorus.

41 Claims, 15 Drawing Sheets

OTHER PUBLICATIONS

U.S. Appl. No. 10/895,351, filed Jul. 21, 2004, Noguchi et al.
U.S. Appl. No. 11/041,258, filed Jan. 25, 2005, Noguchi et al.
U.S. Appl. No. 11/046,249, filed Jan. 31, 2005, Noguchi et al.
U.S. Appl. No. 11/133,204, filed May 20, 2005, Noguchi et al.
U.S. Appl. No. 11/134,292, filed May 23, 2005, Magario et al.
U.S. Appl. No. 11/134,266, filed May 23, 2005, Noguchi et al.
U.S. Appl. No. 11/180,573, filed Jul. 14, 2005, Noguchi et al.
U.S. Appl. No. 11/183,753, filed Jul. 19, 2005, Magario et al.
U.S. Appl. No. 11/214,737, filed Aug. 31, 2005, Magario et al.
U.S. Appl. No. 11/219,706, filed Sep. 7, 2005, Magario et al.
Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).
Magario et al., "Structure and Properties for Carbon Nanofiber/Alminium Nanocomposites," Oct. 11, 2003, 133d Collected Abstracts of the 2004 Autumn Meeting of The Japan Institute of Metals, pp. 566, (with English-language translation of relevant portions).
T. Noguchi, "Carbon Nanotube/Aluminium Composites with Uniform Dispersion," Feb. 20, 2004, Materials Transactions, No. 2, vol. 45, pp. 602-604, (with English-language translation of relevant portions).

Noguchi et al., "Dynamic Properties for CNT/Al Nanocomposites," Mar. 30, 2004, 134th Collected Abstracts of the 2004 Spring Meeting of The Japan Institute of Metals, pp. 353, (with English-language translation of relevant portions).
Magario et al., "Structure and Thermal Properties for CNT/Al Nanocomposites," Mar. 30, 2004, 134th Collected Abstracts of the 2004 Spring Meeting of The Japan Institute of Metals, pp. 353, (with English-language translation of relevant portions).
Noguchi et al., "Preparation and Properties of Aluminum Nanocomposites by Matrix Substitution of Carbon Nanotube/Elastomer Composites," May 20, 2004, 71st The Society of Rubber Industry, Japan Annual Meeting, pp. 30, (with English-language translation of relevant portions).
Noguchi et al., "Development of Carbon Nanotubes/Aluminum Composites and Expectation as Lightweight Member," Aug. 1, 2004, Engineering Materials, vol. 52, No. 8, (with English-language translation of relevant portions).
Magario et al., "CNT Peripheral Structure of CNT/Al Nanocomposites," Sep. 28, 2004; 135th Collected Abstracts of the 2004 Autumn Meeting of The Japan Institute of Metals, pp. 568, (with English-language translation of relevant portions).
Noguchi et al., "Thermal Expansion of CNT/Al Nanocomposites," Sep. 28, 2004, 135th Collected Abstracts of the 2004 Autumn Meeting of The Japan Institute of Metals, pp. 569, (with English-language translation of relevant portions).

* cited by examiner

PARTIALLY ENLARGED VIEW

US 7,758,962 B2

COMPOSITE METAL MATERIAL AND METHOD OF PRODUCING THE SAME, CALIPER BODY, BRACKET, DISK ROTOR, DRUM, AND KNUCKLE

Japanese Patent Application No. 2004-264720, filed on Sep. 10, 2004, is hereby incorporated by reference in its entirety.

BACKGROUND OF THE INVENTION

The present invention relates to a composite metal material and a method of producing the same, a caliper body, a bracket, a disk rotor, a drum, and a knuckle for vehicles.

A composite material using carbon nanofibers has attracted attention. Such a composite material is expected to exhibit improved mechanical strength due to inclusion of the carbon nanofibers.

As a casting method for a metal composite material, a casting method which causes magnesium vapor to permeate and become dispersed in a porous formed product of oxide ceramics while introducing nitrogen gas to cause a molten metal to permeate the porous formed product has been proposed (e.g. JP-A-10-183269).

However, since the carbon nanofibers have strong aggregating properties, it is very difficult to uniformly disperse the carbon nanofibers in the matrix of the composite material. Moreover, the carbon nanofibers have insufficient wettability with a matrix such as a metal material. Therefore, it is difficult to obtain a carbon nanofiber composite material having desired properties. Moreover, expensive carbon nanofibers cannot be efficiently utilized.

In addition, since the related-art casting method which causes a molten metal to permeate the porous formed product of oxide ceramics involves complicated processing, production on an industrial scale is difficult.

SUMMARY

A first aspect of the invention relates to a composite metal material comprising a carbon-based material in a matrix of a metal-based material, wherein the carbon-based material has a first bonding structure in which an element X bonds to a carbon atom on a surface of a carbon material, wherein the matrix includes an amorphous peripheral phase containing aluminum, nitrogen, and oxygen around the carbon-based material, and wherein the element X includes at least one element selected from boron, nitrogen, oxygen, and phosphorus.

A second aspect of the invention relates to a method of producing a composite metal material, the method comprising:

(a) mixing at least a carbon material into an elastomer and dispersing the carbon material by applying a shear force to obtain a composite elastomer;

(b) heat-treating the composite elastomer in the presence of a substance including an element X to vaporize the elastomer included in the composite elastomer to obtain a carbon-based material; and (c-1) causing a molten metal material Z to permeate the carbon-based material in the presence of a substance including an element W, and solidifying the metal material wherein the element X includes at least one element selected from boron, nitrogen, oxygen, and phosphorus, and wherein the element W is at least one of nitrogen and oxygen.

A third aspect of the invention relates to a method of producing a composite metal material, the method comprising:

(a) mixing at least a carbon material into an elastomer and dispersing the carbon material by applying a shear force to obtain a composite elastomer;

(b) heat-treating the composite elastomer in the presence of a substance including an element X to vaporize the elastomer included in the composite elastomer to obtain a carbon-based material; and (c-2) powder forming the carbon-based material together with a metal material Z in the presence of a substance including an element W, wherein the clement X includes at least one element selected from boron, nitrogen, oxygen, and phosphorus, and wherein the element W is nitrogen and/or oxygen.

A fourth aspect of the invention relates to a composite metal material obtained by any one of the above methods.

A fifth aspect of the invention relates to a caliper body for a vehicular disk brake, the caliper body being formed by using a material including any one of the above composite metal materials.

A sixth aspect of the invention relates to a bracket for a vehicular disk brake, the bracket being formed by using a material including any one of the above composite metal materials.

A seventh aspect of the invention relates to a disk rotor for a vehicular disk brake, the disk rotor being formed by using a material including any one of the above composite metal materials.

An eighth aspect of the invention relates to a brake drain for a vehicular drum brake, the brake drum being formed by using a material including any one of the above composite metal materials.

A ninth aspect of the invention relates to an automotive knuckle, the automotive knuckle being formed by using a material including any one of the above composite metal materials.

BRIEF DESCRIPTION OF THE SEVERAL VIEWS OF ATE DRAWING

FIG. 1 schematically shows a mixing method for an elastomer and carbon nanofibers utilizing an open-roll method used in one embodiment of the invention.

DETAILED DESCRIPTION OF THE EMBODIMENT

Figure 1:
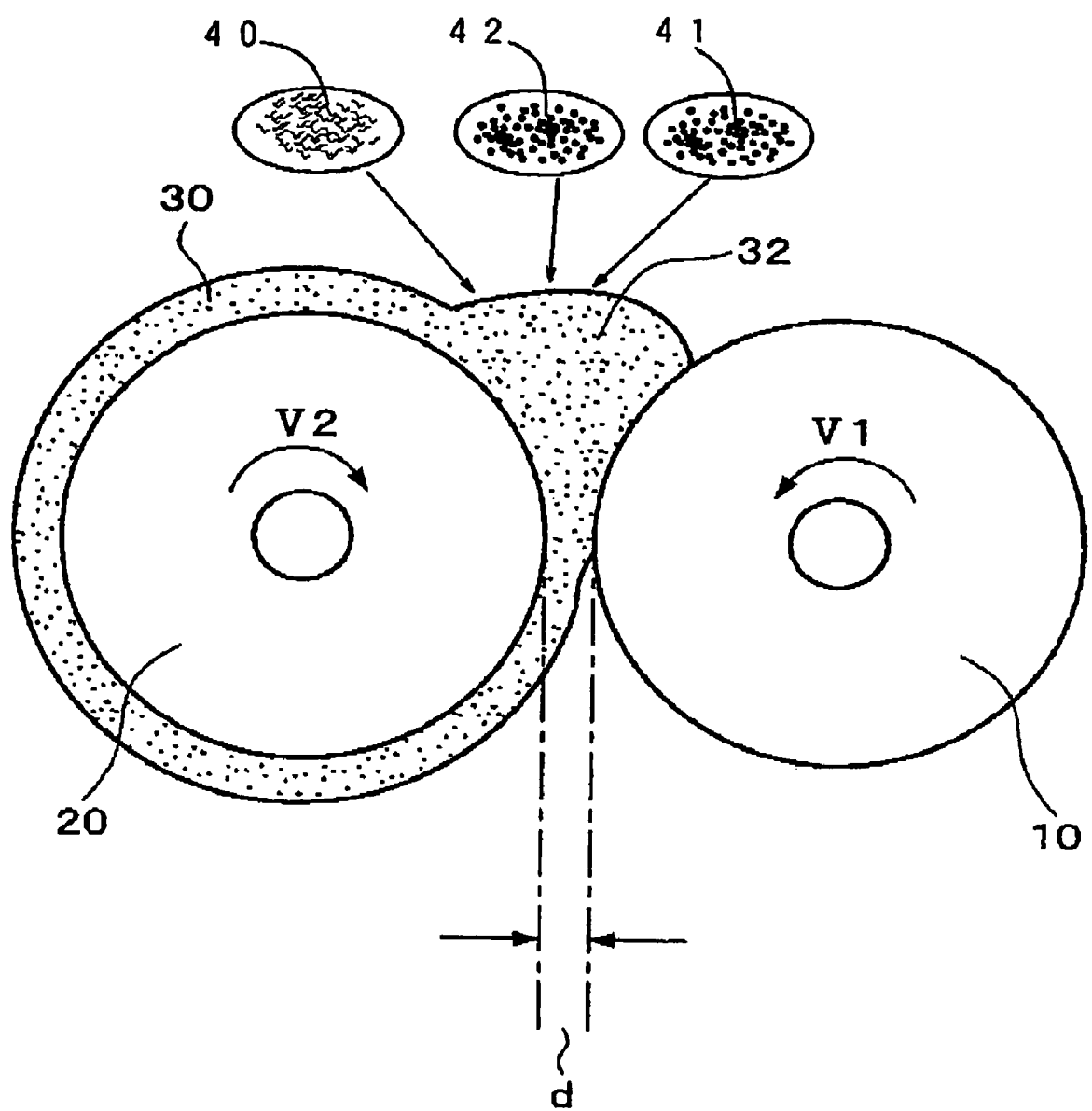

The invention may provide a composite metal material including a carbon-based material exhibiting improved surface wettability, and a method of producing the same. The invention may also provide a caliper body, a bracket, a disk rotor, a drum, and a knuckle for vehicles, which are formed by using a material including the composite metal material.

An embodiment of the invention provides a composite metal material comprising a carbon-based material in a matrix of a metal-based material, wherein the carbon-based material has a first bonding structure in which an element X bonds to a carbon atom on a surface of a carbon material, wherein the matrix includes an amorphous peripheral phase containing aluminum, nitrogen, and oxygen around the carbon-based material, and wherein the element X includes at least one element selected from boron, nitrogen, oxygen, and phosphorus.

Since the composite metal material according to one embodiment of the invention has the first bonding structure on the surface of the carbon material, the wettability between the metal material Z and the carbon material can be improved. Moreover, a direct reaction between the aluminum matrix and carbon can be prevented due to the presence of the first bonding structure, so that formation of aluminum carbide ($Al_4C_3$) can be prevented.

An embodiment of the invention provides a method of producing a composite metal material, the method comprising:

(a) mixing at least a carbon material into an elastomer and dispersing the carbon material by applying a shear force to obtain a composite elastomer, (b) heat-treating the composite elastomer in the presence of a substance including an element X to vaporize the elastomer included in the composite elastomer to obtain a carbon-based material; and (c-1) causing a molten metal material Z to permeate the carbon-based material in the presence of a substance including an element W, and solidifying the metal material Z, wherein the element X includes at least one element selected from boron, nitrogen, oxygen, and phosphorus, and wherein the element W is at least one of nitrogen and oxygen.

An embodiment of the invention provides a method of producing a composite metal material, the method comprising:

(a) mixing at least a carbon material into an elastomer and dispersing the carbon material by applying a shear force to obtain a composite elastomer, (b) heat-treating the composite elastomer in the presence of a substance including an element X to vaporize the elastomer included in the composite elastomer to obtain a carbon-based material; and (c-2) powder forming the carbon-based material together with a metal material Z in the presence of a substance including an element W, wherein the element X includes at least one element selected from boron, nitrogen, oxygen, and phosphorus, and wherein the element W is nitrogen and/or oxygen.

According to the step (a) of the method according to one embodiment of the invention, since an unsaturated bond or group of the elastomer bonds to an active site of the carbon material (terminal radical when the carbon material is carbon nanofiber), the aggregating force of the carbon nanofibers can be reduced, whereby the dispersibility of the carbon nanofibers can be increased. Moreover, free radicals produced in the elastomer shorn by the shear force attack the surface of the carbon material, whereby the surface of the carbon material is activated.

According to the step (b) of the method according to one embodiment of the invention, the elastomer is vaporized by the heat Lament so that a carbon-based material having a structure in which carbon on the surface of the carbon material bonds to the element X is obtained. This carbon-based material easily bonds to the melted metal material Z in the step (c) so that a composite metal material in which the wettability between the carbon material and the metal material Z is improved can be obtained Moreover, since the amorphous peripheral phase of the element W and the s metal material Z is formed in the step (c), the strength of the composite metal material can be increased.

This method of producing a composite metal material may include (b') heat-treating the carbon-based material obtained by the step (b) together with a substance including an element Y and having a melting point lower than a melting point of the carbon material to vaporize the substance including the element Y so that the element Y bonds to the element X.

According to the step (b') of the method of producing a composite metal material according to one embodiment of the invention, a carbon-based material in which the element X and the element Y bond to the surface of the carbon material can be obtained. Since the carbon-based material has a bonding structure of the element X and the clement Y, the carbon-based material easily bonds to the metal material Z so that the wettability between the carbon material and the metal material Z can be improved.

The elastomer according to one embodiment of the invention may be a rubber elastomer or a thermoplastic elastomer When using a rubber elastomer, the elastomer may be in a crosslinked form or an uncrosslinked form. As the raw material elastomer, an uncrosslinked form is used when using a rubber elastomer.

The step (a) of dispersing the carbon nanofiber to the elastomer by applying a shear force may be performed by using an open roll method with a roll interval of 0.5 mm or less, an internal mixing method, a multi-screw extrusion mixing method, or the like.

In the method of producing a composite metal material according to one embodiment of the invention, the step (c) may include melting the metal material Z in a state in which the metal material Z is disposed on the carbon-based material.

A caliper body for a vehicular disk brake, a bracket for a vehicular disk brake, a disk rotor for a vehicular disk brake, a brake drum for a vehicular drum brake, and an automotive knuckle may be formed by using a material containing the composite metal material according to one embodiment of the invention.

Embodiments of the invention are described below in detail with reference to the drawings.

(A) Elastomer

The elastomer has a molecular weight of preferably 5,000 to 5,000,000, or more preferably 20,000 to 3,000,000. If the molecular weight of the elastomer is within this range, since the elastomer molecules are entangled and linked, the elastomer easily enters the space in the aggregated carbon material (e.g. carbon nanofibers) to exhibit an improved effect of separating the carbon nanofibers. If the molecular weight of the elastomer is less than 5,000, since the elastomer molecules cannot be entangled sufficiently, the effect of dispersing the carbon material (e.g. carbon nanofibers) is reduced even if a shear force is applied in the subsequent step. If the molecular weight of the elastomer is greater than 5,000,000, the elastomer becomes too hard so that processing becomes difficult.

The network component of the elastomer in an uncrosslinked form has a spin-spin relaxation time ($T2n/30°$ C.), measured at 30° C. by a Hahn-echo method using a pulsed nuclear magnetic resonance (NMR) technique, of preferably 100 to 3,000 µsec, and still more preferably 200 to 1,000 µsec. If the elastomer has a spin-spin relaxation time ($T2n/30°$ C.) within the above range, the elastomer is flexible and has a sufficiently high molecular mobility. Therefore, when mixing the elastomer and the carbon material (e.g. carbon nanofibers), the elastomer can easily enter the space between the carbon nanofibers due to high molecular mobility. If the spin-spin relaxation time ($T2n/30°$ C.) is shorter than 100 µsec, the elastomer cannot have a sufficient molecular mobility. If the spin-spin relaxation time ($T2n/30°$ C.) is longer than 3,000 µsec, since the elastomer tends to flow as a liquid, it becomes difficult to disperse the carbon material (e.g carbon nanofibers).

The network component of the elastomer in a crosslinked form has a spin-spin relaxation time ($T2n$), measured at 30° C. by a Hahn-who method using a pulsed nuclear magnetic resonance (NMR) technique, of preferably 100 to 2,000 µsec. The reasons therefore are the same as those described for the uncrosslinked form. Specifically, when crosslinking an uncrosslinked form which satisfies the above conditions by using the method of the invention, the spin-spin relaxation time ($T2n$) of the resulting crosslinked form almost falls within the above range.

The spin-spin relaxation time obtained by the Hahn-echo method using the pulsed NMR technique is a measure which indicates the molecular mobility of a substance. In more detail, when measuring the spin-spin relaxation time of the elastomer by the Hahn-echo method using the pulsed NMR technique, a first component having a shorter first spin-spin relaxation time ($T2n$) and a second component having a longer second spin-spin relaxation time ($T2mn$) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90-degree pulse method may be applied instead of the Hahn-echo method. However, since the elastomer according to the invention has a medium spin-spin relaxation time ($T2$), the Hahn-echo method is most suitable. In general, the solid-echo method and the 90-degree pulse method are suitable for measuring a short spin-spin relaxation time ($T2$), the Hahn-echo method is suitable for measuring a medium spin-spin relaxation time ($T2$), and the CPMG method is suitable for measuring a long spin-spin relaxation time ($T2$).

At least one of the main chain, side chain, and terminal chain of the elastomer S includes an unsaturated bond or a group having affinity to the carbon material (particularly to terminal radical when the carbon material is carbon nanofiber), or the elastomer has properties of readily producing such a radical or group. The unsaturated bond or group may be at least one unsaturated bond or group selected from a double bond, a triple bond, and functional groups such as a-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

The carbon nanofiber generally has a structure in which the side surface is formed of a six-membered ring of carbon atoms and the end is closed by introduction of a five-membered ring. However, since the carbon nanofiber has a forced structure, a defect tends to occur, so that a radical or a functional group tends to be formed at the defect. In one embodiment of the invention, since at least one of the main chain, side chain, and terminal chain of the elastomer includes an unsaturated bond or a group having high affinity (reactivity or polarity) to the radical of the carbon nanofiber, the elastomer and the carbon nanofiber can be bonded. This enables the carbon nanofibers to be easily dispersed by overcoming the aggregating force of the carbon nanofibers. When mixing the elastomer and the carbon material such as the carbon nanofibers, free radicals produced by breakage of the elastomer molecules attack the defects of the carbon nanofibers to produce free radicals on the surfaces of the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), poly(vinyl chloride)-based elastomer (TPVC), polyester-based elastomer (TPEE), polyurethane-based elastomer (TPU), polyamide-based elastomer (TPEA), or styrene-based elastomer (SBS); or a mixture of these elastomers may be used. In particular, a highly polar elastomer which readily produces free radicals during mixing of the elastomer, such as natural rubber (NR) or nitrile rubber (NBR), is preferable. An elastomer having a low polarity, such as ethylene propylene rubber (EPDM), may also be used in the invention, since such an elastomer also produces fee radicals by setting the mixing temperature at a relatively high temperature (e.g. 50 to 150° C. for EPDM).

(B) Carbon Material

As the carbon material a carbon allotrope may be used. For example, the Y carbon material may be selected from carbon fiber, carbon black, amorphous carbon, graphite, diamond, fullerene, and the like. The carbon fiber used herein includes carbon nanofiber. When using carbon black, since the carbon black is inexpensive and carbon black of many grades is commercially available, the carbon black can be relatively easily utilized. A nanomaterial such as a minute carbon material (e.g. carbon nanofiber or fullerene) achieves a high reinforcement effect with a small amount of addition.

The amount of the carbon material added may be determined depending on the type and the application of the composite metal material.

As the carbon black used in the invention, carbon black of various grades produced by using various raw materials may be used. The carbon black may be in a state of either elementary particles (primary particles) or an aggregate in which the elementary particles are fused and connected (agglomerate). However, carbon black having a comparatively high structure in which the aggregate is grown is preferable when used as a reinforcement filler.

The carbon black used in the invention has an average elementary particle diameter of preferably 100 nm or less, and still more preferably 50 nm or less. The volume effect and the reinforcing effect are increased as the size of the carbon black particle becomes smaller. In practical application, the average particle diameter is preferably 10 to 30 nm.

The size of the carbon black particle is also indicated by the nitrogen adsorption specific surface area In this case, the nitrogen adsorption specific surface area is 10 $m^2/g$ or more, and preferably 40 $m^2/g$ or more as the nitrogen adsorption specific surface area ($m^{2/}$) measured according to JIS K 6217-2 (2001) "Carbon black for rubber industry—Fundamental characteristics—Part 2: Determination of specific surface area—Nitrogen adsorption methods—Single-point procedures".

The reinforcing effect of the carbon black used in the invention is affected by the degree of structure of the aggregate in which the elementary particles are fused. The reinforcing effect is increased by adjusting the DBP absorption to 50 $cm^3/100$ g or more, and preferably 100 $cm^3/100$ g or more. This is because the aggregate forms a higher structure as the DBP absorption is greater.

As the carbon black used in the invention, carbon black of grades such as SAF-HS (N134, N121), SAF (N110, N115), ISAF-HS (N234), ISAF (N220, N220M), ISAF-LS (N219, N231), ISAF-HS (N285, N229), HAF-HS (N1339, N347), HAF (N330), HAF-LS (N326), T-HS (N351, N299), T-NS (N3301T), MAF (N550M), FEF (N550), GPF (N660, N630, N650, N683), SRF-HS-HM (N762, N774), SRF-LM (N760M, N754, N772, N762), FT, HCC, HCF, MCC, MCF; LEF, MFF, RCF, and RCC, and conductive carbon black such as Tokablack, HS-500, acetylene black, and Ketjenblack may be used.

When the carbon material is carbon fiber, particularly carbon nanofiber, the composite elastomer according to one embodiment of the invention preferably includes the carbon nanofibers in an amount of 0.01 to 50 wt %.

The carbon nanofibers preferably have an average diameter of 0.5 to 500 nm. In order to increase the strength of the composite elastomer, the average diameter of the carbon nanofibers is still more preferably 0.5 to 30 nm. The carbon nanofiber may be either a linear fiber or a curved fiber.

As examples of the carbon nanofiber, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may be formed only of the single-layer structure or the multi-layer structure, or may have the single-layer structure and the multi-layer structure in combination. A carbon material having a partial carbon nanotube structure may also be used. The carbon nanotube may be called a graphite fibril nanotube.

A single-layer carbon nanotube or a multi-layer carbon nanotube is produced to a desired size by using an arc discharge method, a laser ablation method, a vapor-phase growth method, or the like.

In the arc discharge method, an arc is discharged between electrode materials made of carbon rods in an argon or hydrogen atmosphere at a pressure slightly lower than atmospheric pressure to obtain a multi-layer carbon nanotube deposited on the cathode. When a catalyst such as nickel/cobalt is mixed into the carbon rod and an arc is discharged, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given.

The carbon material may be provided with improved adhesion to and wettability with the elastomer by subjecting the carbon material to a surface treatment such as an ion-injection treatment, sputter-etching treatment, or plasma treatment before mixing the carbon material into the elastomer.

(C) Element X and Element Y

The element X is an element which easily bonds to the carbon material and is a light element with a valence of preferably two or more. For example, the element X may include at least one element selected from boron, nitrogen, oxygen, and phosphorus. The element X is preferably oxygen or nitrogen. In particular, since oxygen is present in air, oxygen can be easily used for the heat treatment in the step (b). Moreover, oxygen easily reacts with the activated carbon material such as a radical of carbon nanofiber. Therefore, it is preferable to use oxygen as the substance including the element X. Moreover, since oxygen easily bonds to a metal material such as magnesium), the carbon-based material to which oxygen bonds can easily bond to the metal or semi-metal element Y.

When using oxygen as the element X, oxygen may be mixed into the atmosphere used for the heat treatment in the step (b). When using nitrogen as the element X, the step (b) may be carried out in an ammonium gas atmosphere. When using boron or phosphorus as the element X, the substance including the element X may be mixed into the elastomer before the step (b). In this case, the substance including the element X may be mixed during mixing in the step (a), for example.

The element Y bonds to the element X on the surface of the carbon-based material to improve wettability with the matrix. A carbon material generally exhibits poor wettability with a metal material such as aluminum and magnesium. However, wettability is improved by using the carbon-based material having the element Y on the surface. A particulate substance including the element Y may be mixed and dispersed in the elastomer in advance in the step (a) so that the carbon material is more favorably dispersed in the step (a). In the step (a), the substance including the element Y may be mixed into the elastomer before mixing the carbon material, or may be mixed into the elastomer together with the carbon material.

The substance including the element Y preferably has an average particle diameter greater than the average diameter of the carbon material used. The average particle diameter of the substance including the element Y is 500 μm or less, and preferably 1 to 300 μm. The shape of the substance including the element Y is not limited to spherical. The substance including the element Y may be in the shape of a sheet or scale insofar as turbulent flows occur around the substance including the element Y during mixing.

The substance including the element Y is preferably a metal or semimetal having a melting point lower than the melting point of the carbon material, and still more preferably a low-melting-point (high-vapor-pressure) metal or semimetal having a melting point of 1000° C. or less. If the melting point of the substance including the element Y satisfies the above condition, the substance including the element Y can be vaporized by the heat treatment in the step (b) without damaging the carbon material.

When the carbon-based material is mixed into a matrix material containing aluminum or magnesium, the element Y preferably includes at least one element selected from magnesium, aluminum, silicon, calcium, titanium, vanadium, chromium, manganese, iron, nickel, copper, zinc, and zirconium. Therefore, the substance including the element Y may include at least one element Y selected from these elements. These elements are used as elements which form an aluminum alloy or a magnesium alloy. These elements easily bond to aluminum or magnesium, and can stably exist in a state in which the elements bond to aluminum or magnesium. As the element Y, magnesium, zinc, or aluminum, which exhibits particularly excellent bonding properties with magnesium or aluminum contained in the matrix material, may be used. In particular, when oxygen bonds to the surface of the carbon material as the element X, it is preferable to use magnesium as the element Y since magnesium easily bonds to oxygen. Therefore, the carbon-based material thus obtained has a first bonding structure and a second bonding structure on the surface of the carbon material, the first bonding structure being a structure in which the element X bonds to the carbon atom of the carbon material and the second bonding structure being a structure in which the element Y bonds to the element X. In particular, when the first bonding structure is a structure in which oxygen bonds to the carbon atom of the carbon material, it is preferable that the second bonding structure be a structure in which magnesium bonds to oxygen.

The above description illustrates the case of mixing the substance including the element Y with the elastomer in the step (a). However, the invention is not limited thereto. It suffices that the substance including the element Y be subjected to the heat treatment in the step (b') together with the carbon-based material. For example, the substance including the element Y may be disposed in a heat treatment furnace together with the carbon-based material and vaporized by the heat treatment in the step (b'). In this case, the substance including the element Y may not be particulate. A gasified substance including the element Y may be introduced into a heat treatment furnace.

In the invention, magnesium or aluminum used as the matrix material includes an alloy containing magnesium or aluminum as the major component.

(D) Metal Material Z and Element W

The metal material Z forms the metal-based material used as the matrix of the composite metal material.

In the step (c), the metal material Z is melted in the presence of the substance including the element W to permeate the carbon-based material, and then solidified. The step (c) is described later.

The metal material Z is preferably a metal having a melting point lower than the melting point of the carbon material and higher than the melting point of the substance including the element Y. The metal material Z is still more preferably a light metal having a melting point of 800° C. or less and having an atomic weight of 100 or lass. As examples of the metal material Z, magnesium and aluminum can be given.

In the step (a), a particulate or fibrous metal material Z may be mixed in advance into the elastomer. When using a particulate metal material Z, the carbon material can be dispersed more favorably in the step (a). In this case, the metal material Z may be mixed into the elastomer before mixing the carbon material, or may be mixed into the elastomer together with the carbon material. A particulate metal material Z mixed into the elastomer in the step (a) preferably has an average particle diameter greater than the average diameter of the carbon material used. The average particle diameter of the metal material Z is 500 μm or less, and preferably 1 to 300 μm. The shape of the metal material Z is not limited to spherical. The metal material Z may be in the shape of a sheet or a scale insofar as turbulent flows occur around the metal material Z during mixing.

The metal material Z may be mixed with the carbon-based material at least before the step (b'), and disposed in a heat treatment furnace in the step (b') in a state in which the metal material Z is mixed with the carbon-based material. For example, the step (b') or the step (c) may be performed after mixing the carbon-based material obtained by the step (b) and the metal material Z by using a ball mill or the like. In this case, the metal material Z may not be particulate.

The element W is nitrogen and/or oxygen, and a substance including the element W may be used as the atmosphere gas in the step (c). The element W bonds to the metal material Z to form a part of the matrix of the composite metal material. When using nitrogen and oxygen as the element W, the matrix of the composite metal material forms an amorphous peripheral phase containing aluminum, nitrogen, and oxygen around the carbon-based material.

(E) Step (a) of Mixing Carbon Material into Elastomer and Dispersing Carbon Material by Applying Shear Force The step (a) may be carried out by using an open-roll method, an internal mixing method, a multi-screw extrusion mixing method, or the like.

In one embodiment of the invention, an example using an open-roll method with a roll distance of 0.5 mm or less is described below as the step of mixing the substance including the element Y, the metal material Z, and the carbon material into the elastomer.

FIG. 1 is a diagram schematically showing the open-roll method using two rolls. In FIG. 1, a reference numeral 10 indicates a first roll, and a reference numeral 20 indicates a second roll. The first roll 10 and the second roll 20 are disposed at a predetermined distance d of preferably 1.0 mm or less, and still more preferably 0.1 to 0.5 mm. The first and second rolls are rotated normally or reversely. In the example shown in FIG. 1, the first roll 10 and the second roll 20 are rotated in the directions indicated by the arrows. When the surface velocity of the first roll 10 is indicated by V1 and the surface velocity of the second roll 20 is indicated by V2, the surface velocity ratio (V1/V2). of the first roll 10 to the second roll 20 is preferably 1.05 to 3.00, and still more preferably 1.05 to 1.2. A desired shear force can be obtained by using such a surface velocity ratio. When causing an elastomer 30 to be wound around the second roll 20 while rotating the first and second rolls 10 and 20, a bank 32 of the elastomer is formed between the rolls 10 and 20. After the addition of a substance 41 including the element Y and a metal material Z 42 to the bank 32, the elastomer 30, the substance 41 including the element Y, and the metal material Z 42 are mixed by rotating the first and second rolls 10 and 20. After the addition of a carbon material 40 to the bank 32 in which the elastomer 30, the substance 41 including the element Y, and the metal material Z 42 are mixed, the first and second rolls 10 and 20 are rotated. After reducing the distance between the first and second rolls 10 and 20 to the distance d, the first and second rolls 10 and 20 are rotated at a predetermined surface velocity ratio. This causes a high shear force to be applied to the elastomer 30, so that the aggregated first carbon material is separated by the shear force so that portions of the carbon material are removed one by one and become dispersed in the elastomer 30. When the substance 41 including the element Y and the metal material Z 42 are particulate, the shear force caused by the rolls causes turbulent flows to occur around the substance 41 including the element Y and the metal material Z 42 dispersed in the elastomer These complicated flows cause the carbon material to be further dispersed in the elastomer 30. If the elastomer 30 and the carbon material 40 are mixed before mixing the substance 41 including the element Y and the metal material Z 42, since the movement of the elastomer 30 is restrained by the carbon material 40, it becomes difficult to mix the substance including the element Y. Therefore, it is preferable to mix the substance 41 including the element Y and the metal material Z 42 before adding the carbon material 40 to the elastomer 30.

In the step (a), free radicals are produced in the elastomer shorn by the shear force and attack the surface of the carbon material, whereby the surface of the carbon material is activated. When using natural rubber (NR) as the elastomer, the natural rubber (NR) molecule is cut while being mixed by the rolls to have a molecular weight lower than the molecular weight before being supplied to the open rolls. Since radicals arc produced in the cut natural rubber (NR) molecules and attack the surface of the carbon material during mixing, the surface of the carbon material is activated.

In the step (a), the elastomer and the carbon material are mixed at a comparatively low temperature of preferably 0 to 50° C., and still more preferably 5 to 30° C. in order to obtain as high a shear force as possible. When using the open-roll method, it is preferable to set the roll temperature at the above-mentioned temperature. The distance d between the first and second rolls 10 and 20 is set to be greater than the average particle diameter of the substance 41 including the element Y and the metal material Z 42 even when the distance is minimized. This enables the carbon material 40 to be uniformly dispersed in the elastomer 30.

Since the elastomer according to one embodiment of the invention has the above-described characteristics, specifically, the above-described molecular configuration (molecular length), molecular motion, and chemical interaction with the carbon material, dispersion of the carbon material is facilitated. Therefore, a composite elastomer exhibiting excellent dispersibility and dispersion stability (carbon material rarely reaggregates) can be obtained. In more detail, when mixing the elastomer and the carbon material, the elastomer having an appropriately long molecular length and a high molecular mobility enters the space in the carbon material, and a specific portion of the elastomer bonds to a highly active site of the carbon material through chemical interaction. When a high shear force is applied to the mixture of the elastomer and the carbon material in this state, the carbon material moves accompanying the movement of the elastomer, whereby the aggregated carbon material is separated and dispersed in the elastomer. The dispersed carbon material is prevented from reaggregating due to chemical interaction with the elastomer, whereby excellent dispersion stability can be obtained.

Moreover, since predetermined amounts of the substance including the element Y and the metal material Z are included in the elastomer, a shear force is also applied in the direction in which the carbon material is separated due to a number of complicated flows such as turbulent flows of the elastomer occurring around the substance including the element Y and the metal material Z. Therefore, even a carbon material with a diameter of about 30 nm or less or a carbon material in the shape of a curved fiber moves in the flow direction of each clastomer molecule bonded to the carbon material s due to chemical interaction, whereby the carbon material is uniformly dispersed in the elastomer.

In the step of dispersing the carbon material in the elastomer by applying a shear force, the above-mentioned internal mixing method or multi-screw extrusion mixing method may be used instead of the open-roll method. In other words, it suffices that this step apply a shear force to the elastomer sufficient to separate the aggregated carbon material and produce radicals in the elastomer molecules.

A composite elastomer obtained by the step of mixing and dispersing the substance including the element Y, the metal material Z, and the carbon material in the elastomer (mixing and dispersion step) may be formed after crosslinking the composite elastomer using a crosslinking agent, or may be formed without crosslinking the composite elastomer. As the forming method, a compression forming process, an extrusion forming process, or the like may be used. The compression forming process includes forming the composite elastomer, in which the substance including the element Y, the metal material Z, and the carbon material are dispersed, in a pressurized state for a predetermined time (e.g. 20 min) in a forming die having a desired shape and set at a predetermined temperature (e.g. 175° C.).

In the mixing and dispersing step of the elastomer and the carbon material, or in the subsequent step, a compounding ingredient usually used in processing of an elastomer such as rubber may be added. As the compounding ingredient, a known compounding ingredient may be used. As examples of the compounding ingredient, a crosslinking agent, vulcanizing agent, vulcanization accelerator, vulcanization retarder, softener, plasticizer, curing agent, reinforcing agent, filler, aging preventive, colorant, and the like can be given.

(F) Composite Clastomer Obtained by Step (a)

In the composite elastomer according to one embodiment of the invention, the carbon material is uniformly dispersed in the elastomer as the matrix. In other words, the elastomer is restrained by the carbon material. The mobility of the elastomer molecules restrained by the carbon material is small in comparison with the case where the elastomer molecules are not restrained by the carbon material. Therefore, the first spin-spin relaxation time ($T2n$), the second spin-spin relaxation time ($T2nn$), and the spin-lattice relaxation time ($T1$) of the carbon fiber composite material according to one embodiment of the invention are shorter than those of the elastomer which does not include the carbon material. In particular, when mixing the carbon material into the elastomer containing the substance including the element Y and the metal material Z, the second spin-spin relaxation time ($T2nn$) becomes shorter than that of the elastomer containing only the carbon material. The spin-lattice relaxation time (T1) of the crosslinked form changes in proportion to the amount of the carbon material mixed.

The number of non-network components (non-reticulate chain components) is considered to be reduced for the following reasons, in a state in which the elastomer molecules are restrained by the carbon material. Specifically, when the molecular mobility of the elastomer is entirely decreased by the carbon material, since the number of non-network components which cannot easily move is increased, the non-network components tend to behave in the same manner as the network components. Moreover, since the non-network components (terminal chains) easily move, the non-network components tend to be adsorbed on the active site of the carbon material. It is considered that these phenomena decrease the number of non-network components. Therefore, the fraction (fnn) of components having the second spin-spin relaxation time becomes smaller than that of the elastomer which does not contain the carbon material. In particular, when mixing the carbon material into the elastomer including the substance including the element Y, the fraction (fnn) of components having the second spin-spin relaxation time is further reduced in comparison with the elastomer containing only the carbon material.

Therefore, the composite elastomer according to one embodiment of the invention preferably has values within the following range, measured by the Hahn-echo method using the pulsed NMR technique.

Specifically, it is preferable that, in the uncrosslinked form, the first spin-spin relaxation time (T$2n$) measured at 150° C. be 100 to 3,000 μsec, the second spin-spin relaxation time (T$2nn$) measured at 150° C. be absent or 1,000 to 10,000 μsec, and the fraction (fnn) of components having the second spin-spin relaxation time be less than 0.2.

The spin-lattice relaxation time (T1) measured by the Hahn-echo method using the pulsed NMR technique is a measure which indicates the molecular mobility of a substance in the same manner as the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer.

The composite elastomer according to one embodiment of the invention preferably has a flow temperature, determined by temperature dependence measurement of dynamic viscoelasticity, 20° C. or more higher than the flow temperature of the raw material elastomer. In the composite elastomer according to one embodiment of the invention, the substance including the element Y, the metal material Z, and the carbon material are uniformly dispersed in the elastomer. In other words, the elastomer is restrained by the carbon material as described above. In this state, the elastomer exhibits molecular motion smaller than that of an elastomer which does not include the carbon material, whereby flowability is decreased. The composite elastomer according to one embodiment of the invention having such flow temperature characteristics shows a small temperature dependence of dynamic viscoelasticity to exhibit excellent thermal resistance.

(G) Step (b) of Heat-Treating Composite Elastomer to Produce Carbon-Based Material A carbon-based material, in which the carbon material is dispersed around the substance including the element Y and the metal material Z, can be produced by the step (b) of heat-treating the composite elastomer to vaporize the elastomer included in the composite elastomer.

The heat treatment conditions may be arbitrarily selected depending on the type of elastomer used. The heat treatment temperature is set at a point equal to or higher than the vaporization temperature of the elastomer and lower than the vaporization temperatures of the carbon material, the substance including the element Y, and the metal material Z.

The step (b) may be performed in the presence of the substance including the element X so that a carbon-based material in which the element X bonds to the carbon atom of the carbon material is obtained. For example, the composite elastomer may include the substance including the element X, and the element X may be caused to bond to the carbon atom of the carbon material by the heat treatment in the step (b). Or, the step (b) may be performed in an atmosphere containing the substance including the element X so that the element X is caused to bond to the carbon atom of the carbon material, for example.

In the step (b) according to one embodiment of the invention, the composite elastomer obtained by the step (a) is disposed in a heat treatment furnace, and the atmosphere inside the furnace is heated to the vaporization temperature of the elastomer (e.g. 500° C.). The elastomer is vaporized by heating, and carbon on the surface of the carbon material activated by the step (a) bonds to the element X contained in the atmosphere inside the furnace or included in the elastomer, whereby a surface-treated carbon-based material is obtained. Since the surface of the carbon material has been activated by free radicals of the elastomer molecules shorn by the step (a), the surface of the carbon material can easily bond to oxygen contained in the atmosphere inside the furnace, for example. Since the surface of the carbon-based material thus obtained is oxidized and activated, the carbon-based material easily bonds to the element Y or the metal material Z.

(H) Step (b') of Heat-Treating Carbon-Based Material Obtained by Step (b) Together with Substance Including Element Y In the step (b'), the carbon-based material obtained by the step (b) is heat-treated together with the particulate or fibrous metal material Z having a melting point lower than the melting point of the carbon material and the substance including the element Y and having a melting point lower than the melting point of the metal material Z to vaporize the substance including the element Y so that the element Y bonds to the element X.

The heat treatment temperature in the step (b') is set at a point higher than the heat treatment temperature in the step (b), equal to or higher than the vaporization temperature of the substance including the element Y, and lower than the vaporization temperatures of the metal material Z and the carbon material.

When the carbon-based material obtained by the step (b) and the substance including the element Y are heated to a temperature equal to or higher than the vaporization temperature of the substance including the element Y in a heat treatment furnace, the substance including the element Y is vaporized so that the element Y bonds to the element X bonded to the surface of the carbon-based material.

The substance including the element Y may be mixed into the composite elastomer in advance by mixing the substance including the element Y and the elastomer in the step (a) as stated above, or may not be mixed into the composite elastomer. When the substance including the element Y is not mixed into the composite elastomer in advance, the substance including the element Y may be disposed in a heat treatment furnace in the step (b') together with the carbon-based material. The substance including the element Y vaporized by the heat treatment bonds to the element X bonded to the surface of the carbon-based material. The step (b') may be performed by disposing the carbon-based material in the presence of the substance including the element Y which has been vaporized.

When the metal material Z is mixed into the elastomer in the step (a) as in one embodiment of the invention, the carbon-based material can be prevented from reaggregating due to the presence of the metal material Z.

The vaporized element Y easily bonds to the element X present on the surface of the carbon-based material so that a compound of the element X and the element Y is produced. The element X prevents direct bonding between the element Y (or metal material Z) and the carbon material. For example, when the element Y is aluminum, if the carbon material directly bonds to aluminum, a substance which easily reacts with water, such as $Al_4C_3$, is produced. Therefore, it is preferable to perform the step (b) of causing the element X to bond to the surface of the carbon material before the step (b') of vaporizing the material Y.

(I) Step (c) of Causing Melted Metal Material Z to Permeate Carbon-Based Material to Obtain Composite Metal Material In the step (c) according to one embodiment of the invention, a step (c-1) of causing the molten metal material Z to permeate the carbon-based material obtained by the step (b) or (b') in the presence of the substance including the element W and solidifying the metal material Z may be employed. In the step (c-1), the metal material Z may be in the shape of an ingot, and may be melted in a state in which the metal material Z is disposed on the carbon-based material. The metal material Z which has permeated the carbon-based material bonds to the element X or the element Y bonded to the carbon-based material and also bonds to the element W in the atmosphere to form an amorphous peripheral phase of the metal-based material around the carbon-based material.

In one embodiment of the invention, a method of performing the step (b) to the step (c) by using a pressureless permeation method which causes a molten metal to permeate the carbon-based material is described below in detail with reference to FIGS. 2 and 3.

Figure 2:
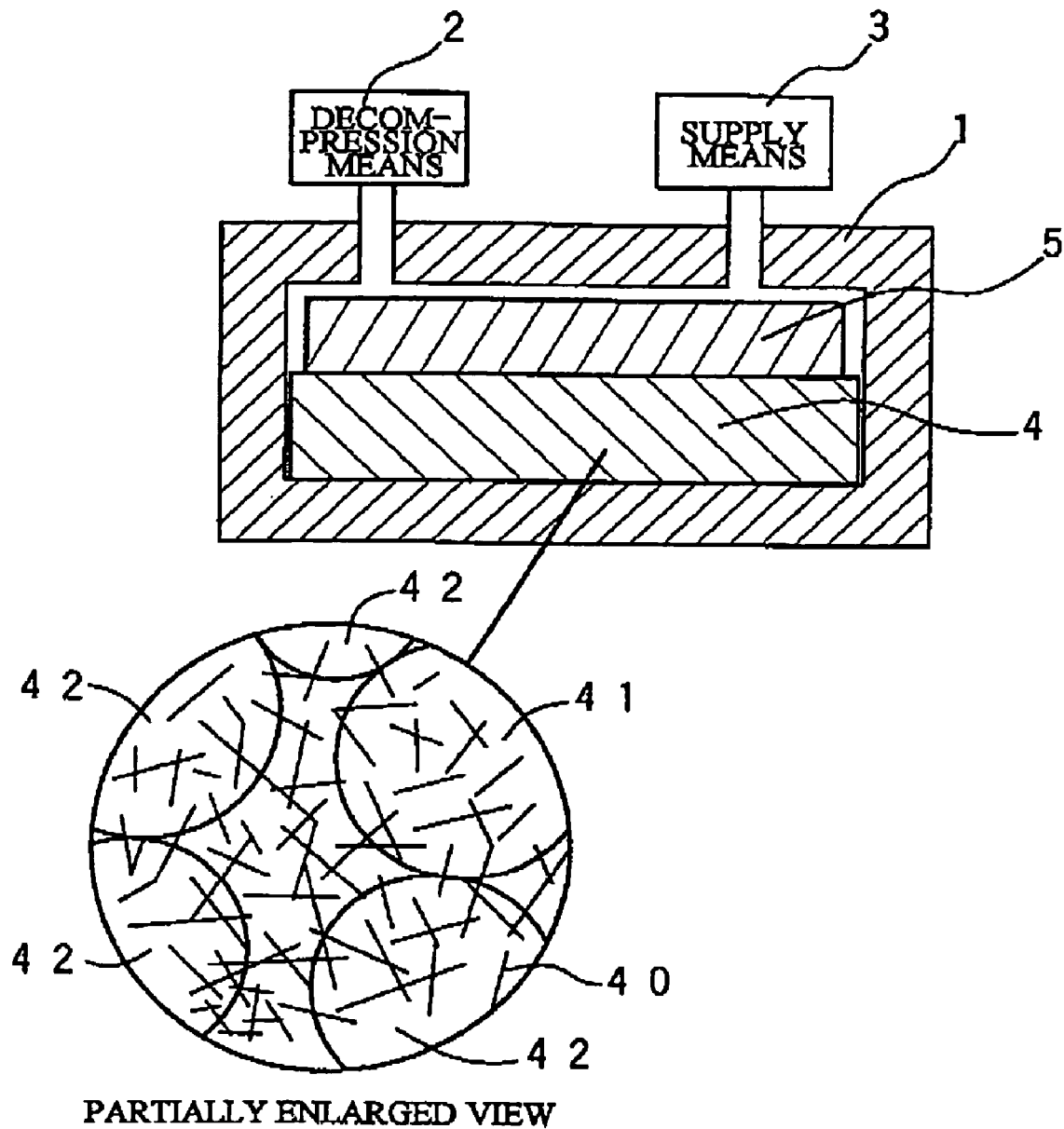
FIG. 2 is a schematic configuration diagram of a device for producing a carbon fiber-metal composite material by using a pressureless permeation method.
Figure 3:
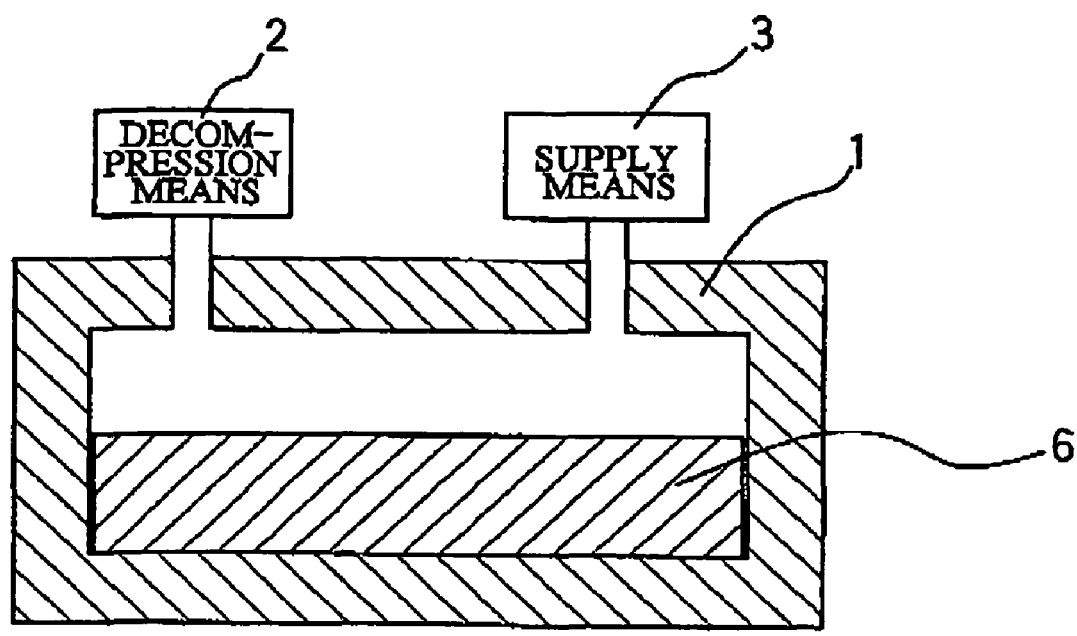
FIG. 3 is a schematic configuration diagram of a device for producing a carbon fiber-metal composite material by using a pressureless permeation method.

FIGS. 2 and 3 are schematic configuration diagrams of a device for producing the composite metal material by using the pressureless permeation method. The step (c-1) may be carried out subsequent to the step (b) or the step (b'). As the composite elastomer obtained by the step (a) according to the above-described embodiment, a composite elastomer 4, which is mixed with magnesium particles 41 (reducing agent) as the substance including the element Y, aluminum particles 42 as the metal material Z used as the matrix, and carbon nanofibers 40 as the carbon material, and is compression-formed in a forming die having the shape of the final product, may be used, for example. In FIG. 2, the composite material 4 formed in advance is placed in a sealed container 1. An ingot of the metal material Z used as the matrix, such as an aluminum ingot 5, is placed on the composite elastomer 4. The atmosphere inside the container 1 may be removed by decompression means 2 such as a vacuum pump connected with the container 1. A substance including the element X and a substance including the element W are introduced into the container 1 from supply means 3 connected with the container 1. A nitrogen gas cylinder may be used as the supply means. A small amount of oxygen is contained in the nitrogen gas to be introduced. In one embodiment of the invention, the element X is oxygen and the element W is nitrogen and oxygen.

The composite elastomer 4 and the aluminum ingot 5 placed in the container 1 are slowly heated to a temperature equal to or higher than the melting point of aluminum by using heating means (not shown) provided in the container 1. Among the materials which make up the heated composite elastomer 4, the elastomer having the lowest melting point is vaporized to effect the step (b). Specifically, the element X bonds to carbon on the surface of the carbon material to obtain a carbon-based material. When the temperature inside the container 1 is further increased, the substance including the element Y (magnesium particles 41) and having a melting point lower than the melting point of the metal material Z is vaporized to effect the step (b'). Specifically, the vaporized element Y bonds to the element X on the surface of the carbon-based material. The heated aluminum ingot 5 melts to become molten aluminum (molten metal material Z), and permeates the space formed by vaporization of the elastomer. The container 1 is filled with a reducing atmosphere due to vaporization of the magnesium particles 41 so that the magnesium particles 41 permeate the space between the aluminum particles 42 due to reduction of the molten aluminum. Then, heating using the heating means of the container 1 is terminated so that the molten aluminum (metal material Z) is cooled and solidified to obtain a composite metal material 6, as shown in FIG. 3, in which the carbon-based material is uniformly dispersed The wettability between the carbon-based material and the matrix can be improved by selecting a material which easily bonds to the metal material Z used as the matrix as the element Y. Therefore, a homogenous composite metal material in which the difference of mechanical properties is reduced over the entire material is obtained.

The substance including the element Y may be mixed in the step (a) as in one embodiment of the invention, or the substance including the element Y may be disposed in or introduced into the container 1 in the steps (b) to (c).

The above-descibed embodiment illustrates the pressureless permeation method. However, a pressure permeation method which applies pressure by utilizing the pressure of an atmosphere such as an inert gas may also be used, for example.

In the step (c) according to one embodiment of the invention, a step (c-2) of powder forming the molten metal material Z together with the carbon-based material obtained by the step (b) or (b') in the presence of the substance including the element W may be employed. In the step (c-2), the metal material Z may be in the shape of particulate or fibrous powder, and may be powder-formed together with the carbon-based material. The carbon-based material and the metal material Z are mixed by dry blending or the like before the step (c-2). The dispersibility of the carbon-based material is improved by preferably mixing the metal material Z into the elastomer in advance as in the step (a) according to one embodiment of the invention.

In the step (c-2) according to one embodiment of the invention, the carbon-based material obtained according to the above-described embodiment and the metal material Z are compressed in a die either directly or after mixing with another matrix metal material formed of the same metal as the metal material Z, and sintered at the sintering temperature of the metal material Z (eg 550° C. when the metal material Z is aluminum) to obtain a composite metal material.

The powder forming according to one embodiment of the invention is the same as powder forming in a metal forming process and involves powder metallurgy. The powder forming according to one embodiment of the invention not only includes the case of using a powder raw material, but also includes the case of using a raw material formed in the shape of a block by compression-performing the carbon-based material obtained by the step (b) or (b') and the metal material Z. As the powder forming method, a general sintering method, a spark plasma sintering (SPS) method using a plasma sintering device, or the like may be employed. The carbon-based material and the particles of the matrix metal material may be mixed by dry blending, wet blending, or the like. When using wet blending, it is preferable to mix (wet-blend) the matrix metal material with the powder of the carbon-based material in a solvent.

The composite metal material produced by such powder forming is obtained in a state in which the carbon-based material is dispersed in the matrix metal material (metal material Z). In particular, since the metal material Z and the carbon-based material have been uniformly dispersed by the step (a), a homogenous composite metal material can be obtained by directly powder forming the metal material Z and the carbon-based material. When further adding a matrix metal material to the carbon-based material, a composite metal material having desired properties can be produced by adjusting the mixing ratio of the metal material Z mixed in advance to the matrix metal material.

In the step (c-2), the metal material Z bonds to the element X or the element Y bonded to the carbon-based material and also bonds to the element W in the atmosphere by powder forming in the same manner as in the step (c-1) to form an peripheral phase of the metal-based material around the carbon-based material.

The composite metal material obtained by the step (c-1) and the step (c-2) is a composite metal material including the carbon-based material in the matrix of the metal-based material, in which the carbon-based material includes the first bonding structure in which the element X bonds to the carbon atom on the surface of the carbon material and the second bonding structure in which the element Y bonds to the element X. The matrix of the composite metal material includes an amorphous peripheral phase formed of the element W and the metal material Z around the carbon-based material. When the element W includes nitrogen and oxygen and the metal material Z is aluminum, the peripheral phase is formed around the carbon-based material as an amorphous peripheral phase containing aluminum, nitrogen, and oxygen. In particular, since the peripheral phase contains aluminum, which is the same as the metal material Z, as the major constituent element, the peripheral phase exhibits excellent wettability with the crystalline aluminum as the matrix.

A composite metal material, in which the wettability between the metal material Z as the matrix and the carbon-based material is improved, is obtained by formation of such an amorphous peripheral phase.

The surface of the carbon-based material (e.g. carbon nanofiber) has a structure in which the carbon atom of the carbon nanofiber bonds to the element X and the element X bonds to the element Y. Therefore, the composite metal material has a structure in which the surface of the carbon material (e.g. carbon nanofiber) is covered with the compound layer (e.g. oxde layer) of carbon and the element X and is also covered with the reaction product layer of the element X and the element Y (e.g. magnesium). The surface structure of the composite metal material may be analyzed by X-ray photoelectron spectroscopy (XPS) or energy dispersive spectrum (EDS) analysis.

The peripheral phase in the composite metal material may be determined by observation using a field emission scanning electron microscope (FE-SEM) and elemental analysis of the vicinity of the irradiation point.

The composite metal material thus obtained may be used in various applications. For example; a caliper body for a vehicular disk brake, a bracket for a vehicular disk brake, a disk rotor for a vehicular disk brake, a brake drum for a vehicular drum brake, and an automotive knuckle may be formed by using the composite metal material or a material containing the composite metal material. The entire caliper body, bracket, disk rotor, brake drum, and knuckle may be formed by using the composite metal material according to one embodiment of the invention, or the caliper body, bracket, disk rotor, brake drum, and knuckle may partially include the composite metal material. When the caliper body, bracket, disk rotor, brake drum, and knuckle partially include the composite metal material, the composite metal material may be disposed in a mold when casting each product, or the step (c) may be performed after disposing the carbon-based material of each product in a mold.

Figure 12:
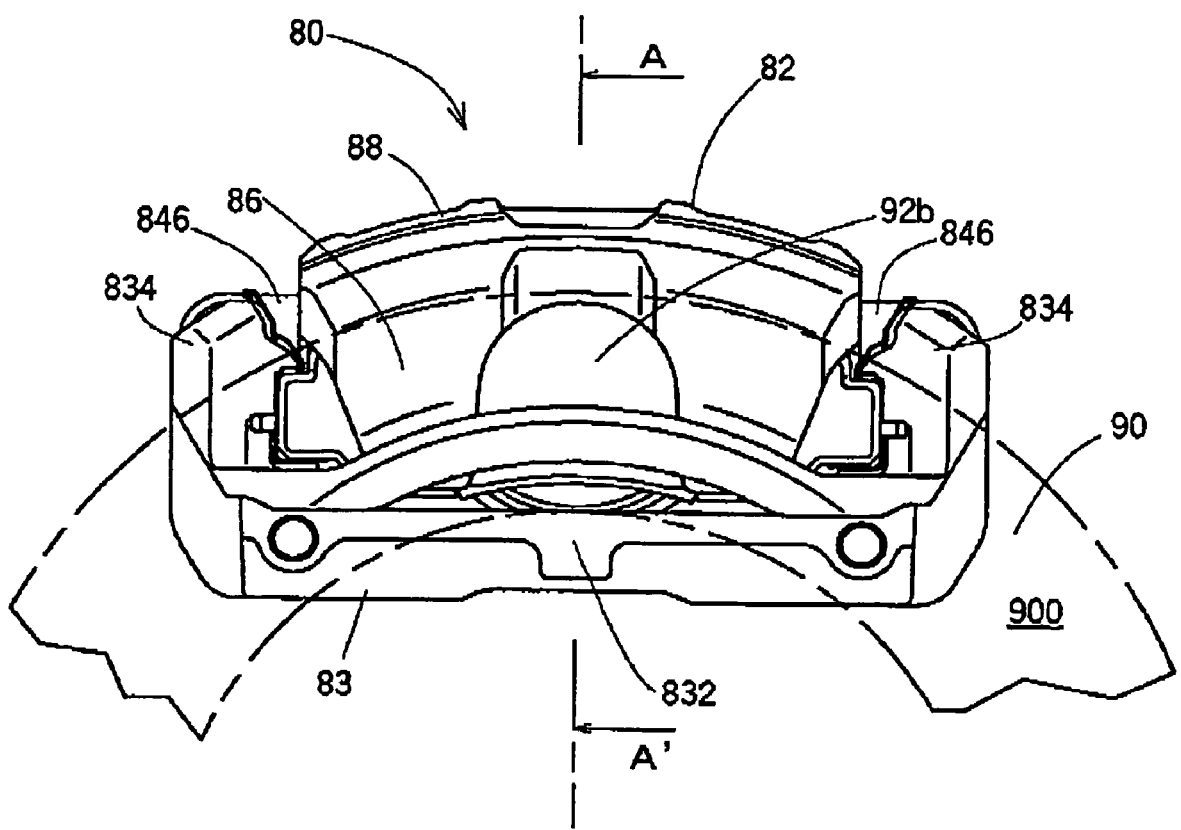
FIG. 12 is a front view of a vehicular disk brake.
Figure 13:
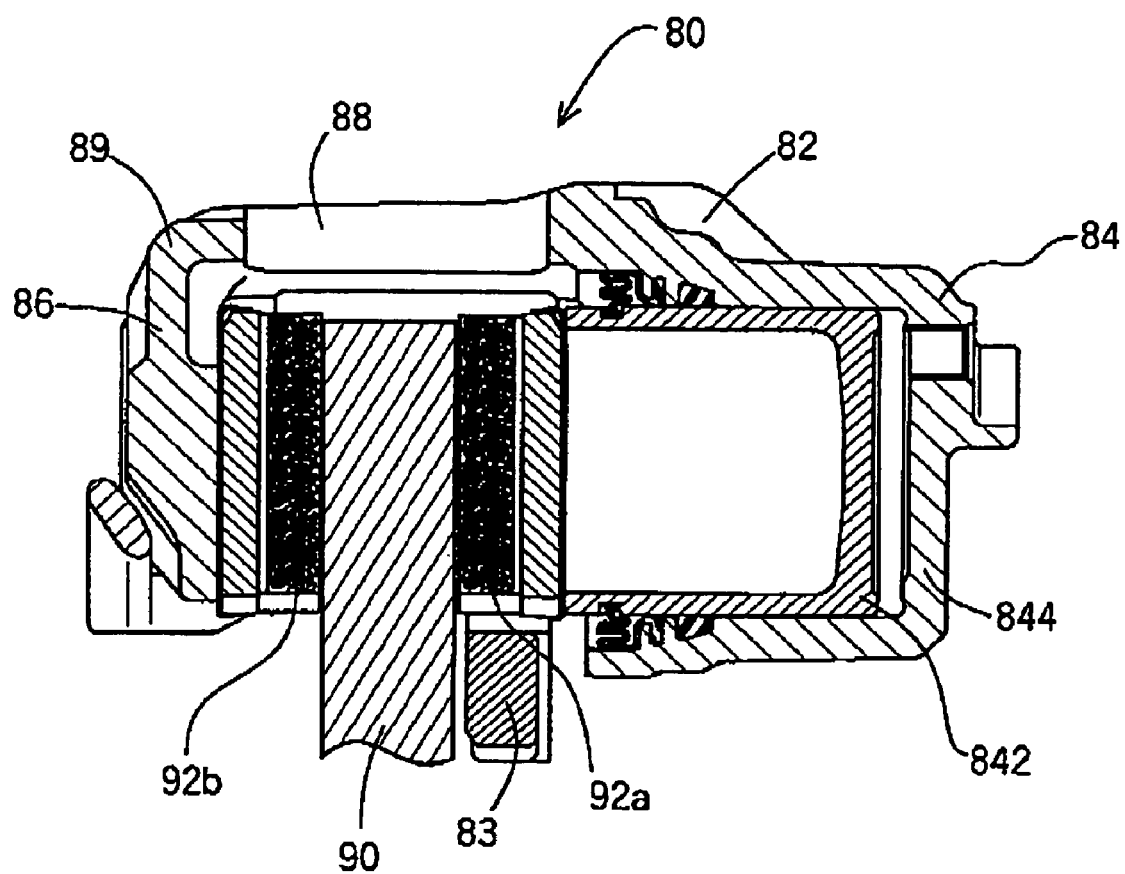
FIG. 13 is a cross-sectional view of the vehicular disk brake along the line A-A'.
Figure 14:
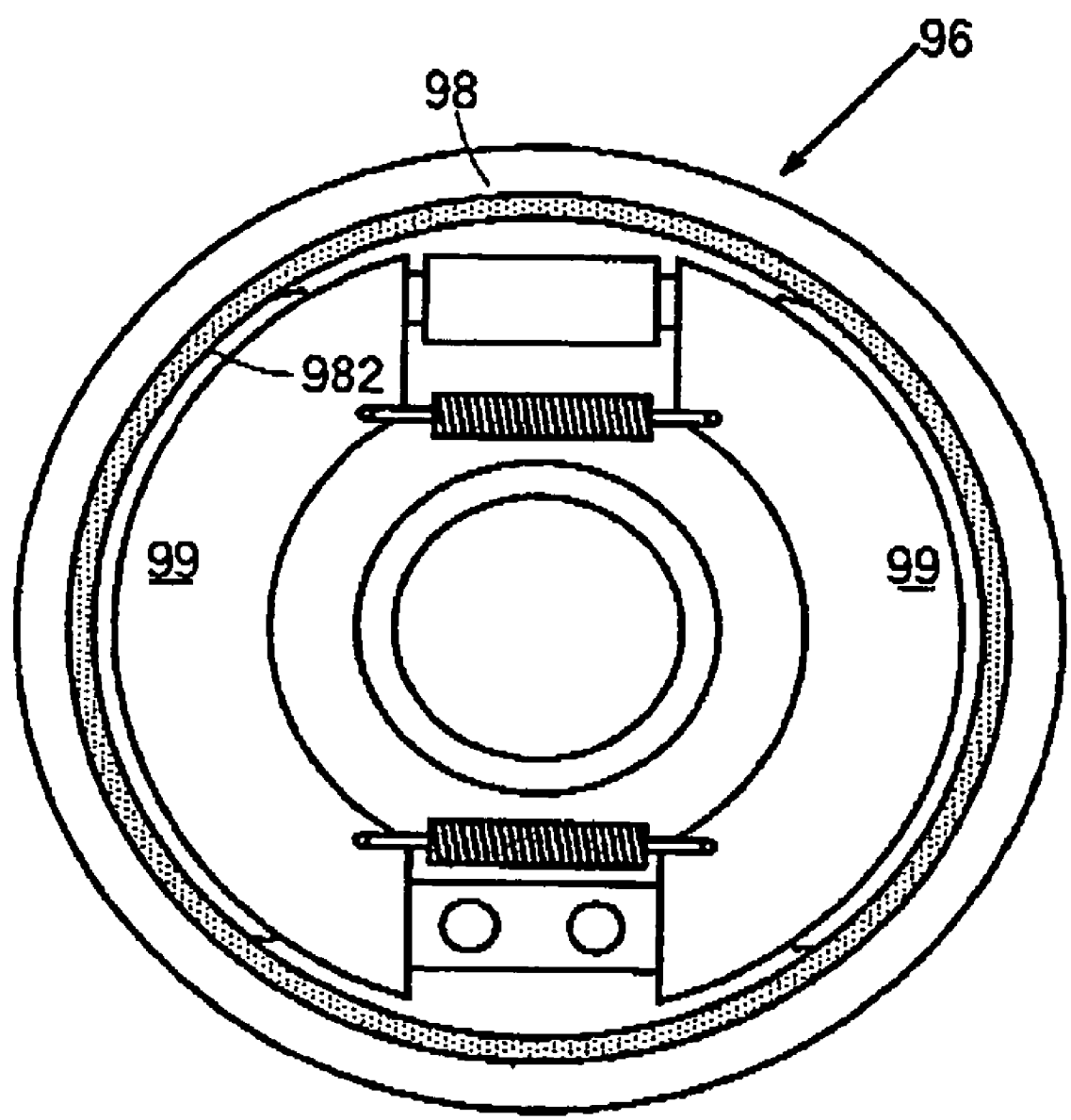
FIG. 14 is a front view of a vehicular drum brake.
Figure 15:
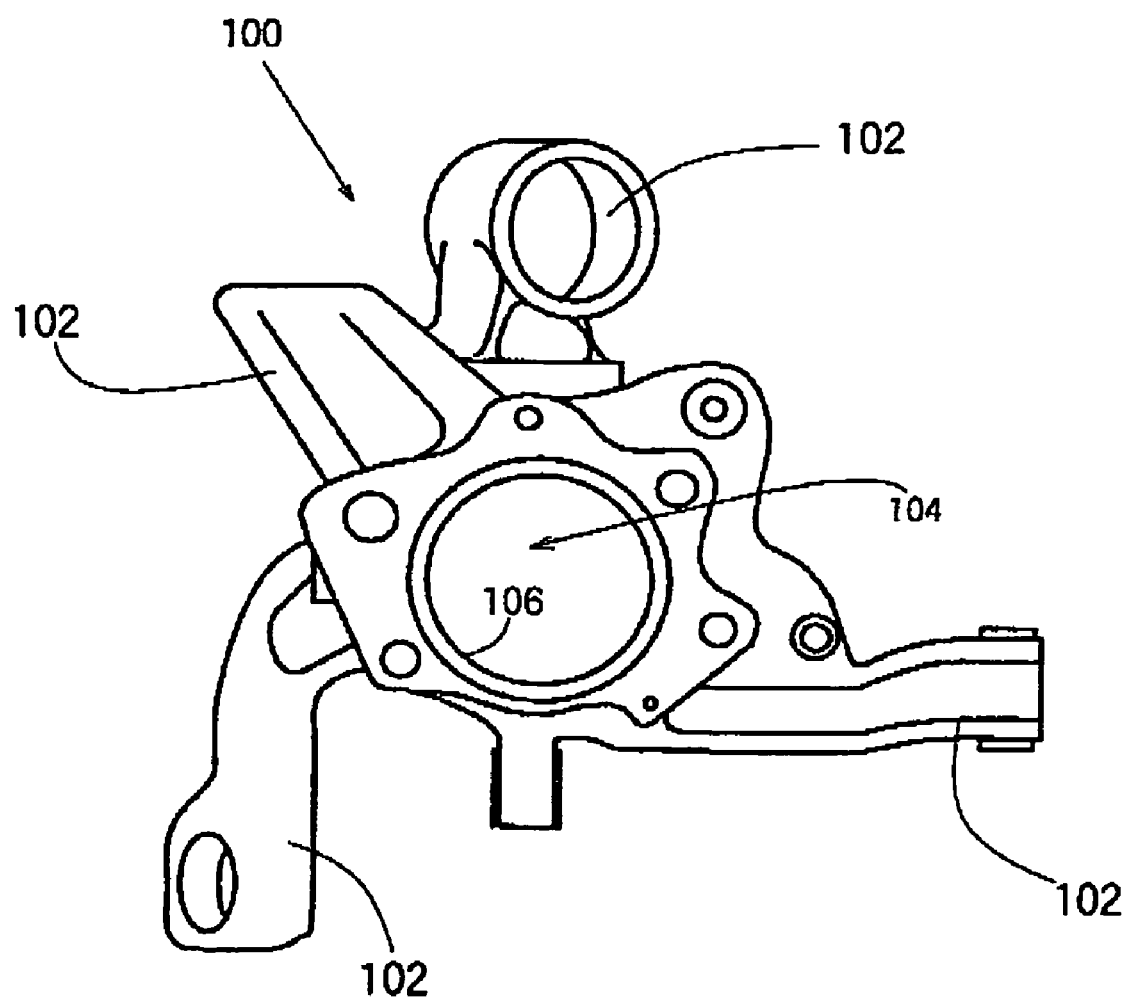
FIG. 15 is a front view of an automotive knuckle.

FIG. 12 is a front view of a vehicular disk brake FIG. 13 is a cross-sectional view of the vehicular disk brake along the line A-A' shown in FIG. 12. FIG. 14 is a front view of a vehicular drum brake. FIG. 15 is a front view of an automotive knuckle.

As shown in FIGS. 12 and 13, a caliper body 82 of a pin-slide type vehicular disk brake 80 includes an action section 84 and a reaction section 86 which support pads 92a and 92b containing a frictional material and disposed on either side of a disk rotor 90 which rotates together with a wheel (not shown), and a bridge section 88 which connects the action section 86 and the reaction section 86 across the disk rotor 90. The action section 84 is provided on the inner side of the vehicle body, and includes a cylinder 844 having a piston 842 provided therein. The pad 92a is disposed at the end of the piston 842 on the side of the disk rotor 90. In the reaction section 86, the pad 92b is disposed at a position opposite to the pad 92a.

A bracket 83 of the vehicular disk brake is secured to a knuckle at a fixing section 832, and the caliper body 82 is slidably attached to caliper support arms 834 of the bracket 83. In more detail, sliding pins (not shown) which extend toward the reaction section 86 are secured to installation arms 846 which protrude from either side of the action section 84 of the caliper body 82 so that the caliper body 82 is slidably attached inside the caliper support arms 834 of the bracket 83.

As shown in FIG. 15, an automotive knuckle 100 includes a plurality of arms 102 for installation of a suspension or the like, and an engagement hole 104 in which a ball bearing (not shown) is provided is formed at the center of each arm 102, for example. The inner circumferential surface of the engagement hole 104 is formed as a ball bearing installation section 106.

In particular, since stress is concentrated on the bridge section 88 of the caliper body 82, an L-shaped connection section 89 between the bridge section 88 and the reaction section 86, the fixing section 832 of the bracket 83, the arm 102 and the ball bearing installation section 106 of the knuckle 100, and the like, it is preferable to reinforce these sections by using the composite metal material according to the invention. The entire caliper body, bracket, and knuckle may be formed by using the composite metal material according to the invention. Or, the composite metal material may be partially disposed in the stress concentration section as a reinforcing material, and the reinforcing material may be inserted into the matrix metal material of the product.

Since the disk rotor 90 of the vehicular disk brake 80 and a brake drum 98 of a drum brake 96 shown in FIG. 14 respectively have sliding surfaces 900 and 982, the wear properties can be improved by employing the composite metal material according to the invention. For example, the flat and smooth sliding surface 900 of the disk rotor 90 against which the pads 92a and 92b containing the frictional material are pressed is formed on each side of the disk-shaped body. For example, the sliding surface 982 of the brake drum 98 against which a brake shoe 99 is pressed is formed on the inner circumferential surface of the brake drum 98. Since the sliding surfaces 900 and 982 of the disk rotor 90 and the brake drum 98 are sliding parts, it is preferable to reinforce the sliding surfaces 900 and 982 by using the composite metal material according to the invention. The entire disk rotor 90 or brake drum 98 may be formed by using the composite metal material according to the invention. Or, the composite metal material may be partially provided to such a sliding part as a reinforcing material.

Aluminum is used as the matrix material of the body of the caliper body 82, bracket 83, disk rotor 90, drum 98, and knuckle 100 for convenience of manufacture. The matrix material may be appropriately selected from light metals such as aluminum, magnesium, and titanium in order to reduce the weight of the product.

Examples according to the invention and comparative examples are described below. However, the invention is not limited to the following examples.

EXAMPLES 1 TO 3 AND COMPARATIVE EXAMPLES 1 AND 2

(1) Preparation of Sample (a) Preparation of Composite Elastomer (Uncrosslinked Sample)

Step 1: Open rolls with a roll diameter of six inches (roll temperature: 10 to 20° C.) were provided with a predetermined amount (100 g) of a polymer substance (100 parts by weight (phr)) shown in Table 1, and the polymer substance was wound around the roll.

Step 2: A substance including the element Y (magnesium particles) and a metal material Z (aluminum particles) were added to the polymer substance (elastomer) in amounts (arts by weight) shown in Table 1. The roll distance was set at 1.5 mm. The details of the substance including the element Y and the metal material Z added are described later.

Step 3: Carbon nanofibers ("CNT" in Table 1) were added to the polymer substance including the metal particles in an amount (parts by weight) shown in Table 1. The roll distance was set at 1.5 mm.

Step 4: After the addition of the carbon nanofibers, the mixture of the polymer substance and the carbon nanofibers was removed from the rolls.

Step 5: After reducing the roll distance from 1.5 mm to 0.3 mm, the mixture was supplied and tight milled. The surface velocity ratio of the two rolls was set at 1.1. The tight milling was repeatedly performed ten times.

Step 6: After setting the rolls at a predetermined distance (1.1 mm), the mixture subjected to tight milling was supplied and sheeted.

Composite elastomers (uncrosslinked samples) of Examples 1 to 3 were thus obtained. An aluminum ingot was used as Comparative Example 1, and carbon nanofibers were used as Comparative Example 2.

In Examples 1 to 3, natural rubber (NR), EPDM, and nitrile rubber (NBR) were respectively used as the elastomer. Magnesium particles having an average particle diameter of 50 μm were used as the substance including the element Y, and pure aluminum particles (aluminum: 99.7%) having an average particle diameter of 50 μm were used as the metal material Z.

As the carbon nanofibers, carbon nanofibers having a diameter (fiber diameter) of about 10 to 20 nm were used.

(b to c) Preparation of Composite Metal Material

The composite elastomer (uncrosslinked sample) obtained by (a) in each of Examples 1 to 3 was disposed in a container (furnace). After placing an aluminum ingot (pure aluminum ingot) on the composite elastomer, the composite elastomer and the aluminum ingot were slowly heated to the melting point (800° C.) of aluminum in an inert gas (nitrogen containing a small amount of oxygen) atmosphere. In the heating process, the elastomer was vaporized at a temperature equal to or higher than the vaporization temperature of the elastomer, magnesium was then vaporized, and the aluminum ingot melted thereafter. The molten aluminum permeated the composite elastomer to replace the elastomer. After completion of permeation of the molten aluminum, the molten aluminum was allowed to cool and solidify to obtain a composite metal material.

(2) Measurement Using Pulsed NMR Technique

Each composite elastomer was subjected to measurement by the Hahn-echo method using the pulsed NMR technique. The measurement was conducted using "JMN-MU25" manufactured by JEOL, Ltd. The measurement was conducted under conditions of an observing nucleus of $^1H$, a resonance frequency of 25 MHz, and a 90-degree pulse width of 2 μsec, and a decay curve was determined while changing Pi in the pulse sequence (90°x-Pi-180°x) of the Hahn-echo method. The sample was measured in a state in which the sample was inserted into a sample tube within an appropriate magnetic field range. The measurement temperature was 150° C. The first spin-spin relaxation time ($T2n$), the second spin-spin relaxation time ($T2nn$), and the fraction (fnn) of components having the second spin-spin relaxation time were determined for the raw material elastomer and the composite elastomer. The first spin-spin relaxation time ($T2n$) at a measurement temperature of 30° C. was also measured for the raw material elastomer. The measurement results are shown in Table 1. The second spin-spin relaxation time ($T2nn$) was not detected in Examples 1 to 3. Therefore, the fraction (fnn) of components having the second spin-spin relaxation time was zero.

(3) Measurement of Flow Temperature

The flow temperature were determined for the raw material elastomer and the composite elastomer by dynamic viscoelasticity measurement (JIS K 6394). In more detail, the flow temperature was determined by applying a sine vibration (±0.1% or less) to the sample having a width of 5 m, a length of 40 mm, and a thickness of 1 mm, and measuring the stress and phase difference d generated by applying the sine vibration The temperature was changed firm −70° C to 150° C. at a temperature rise rate of 2° C./min. The results are shown in Table 1. In Table 1, the case where the flow phenomenon of the sample was not observed up to 150° C. is indicated as "150° C. or higher".

(4) XPS Analysis of Carbon-Based Material

Figure 4:
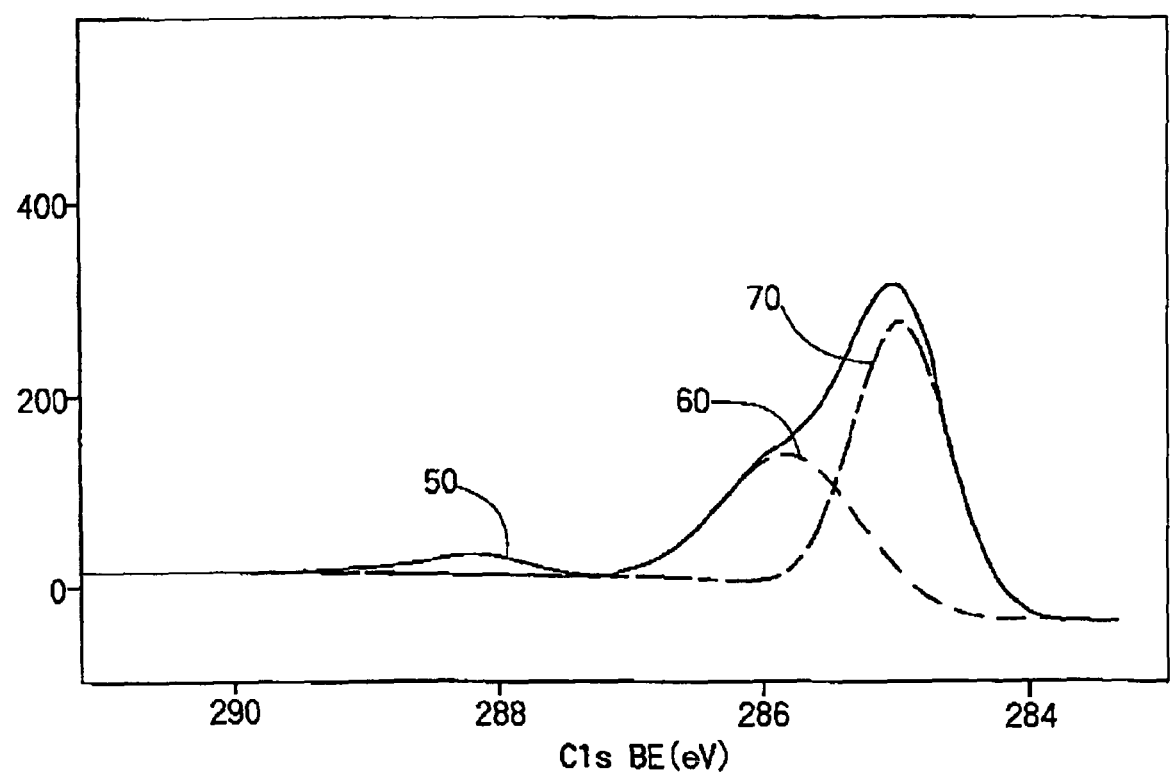
FIG. 4 is a schematic diagram of XPS data on a carbon-based material obtained in an example according to the invention.

Table 1 shows XPS analysis results of the carbon-based materials in the composite metal materials obtained by (c) in Examples 1 to 3. In Table 1, the case where the presence of a carbon-oxygen bond was confirmed on the surface of the first carbon material in the carbon-based material is indicated as "surface oxidation", and the case where the presence of a carbon-oxygen bond was not confirmed is indicated as "none". FIG. 4 shows a schematic diagram of XPS data on the carbon-based material of Example 2. A first line segment 50 indicates a double bond "C=O", a second line segment 60 indicates a single bond "C—O", and a third line segment 70 indicates a carbon-carbon bond.

(5) EDS Analysis of Carbon-Based Material

Figure 5:
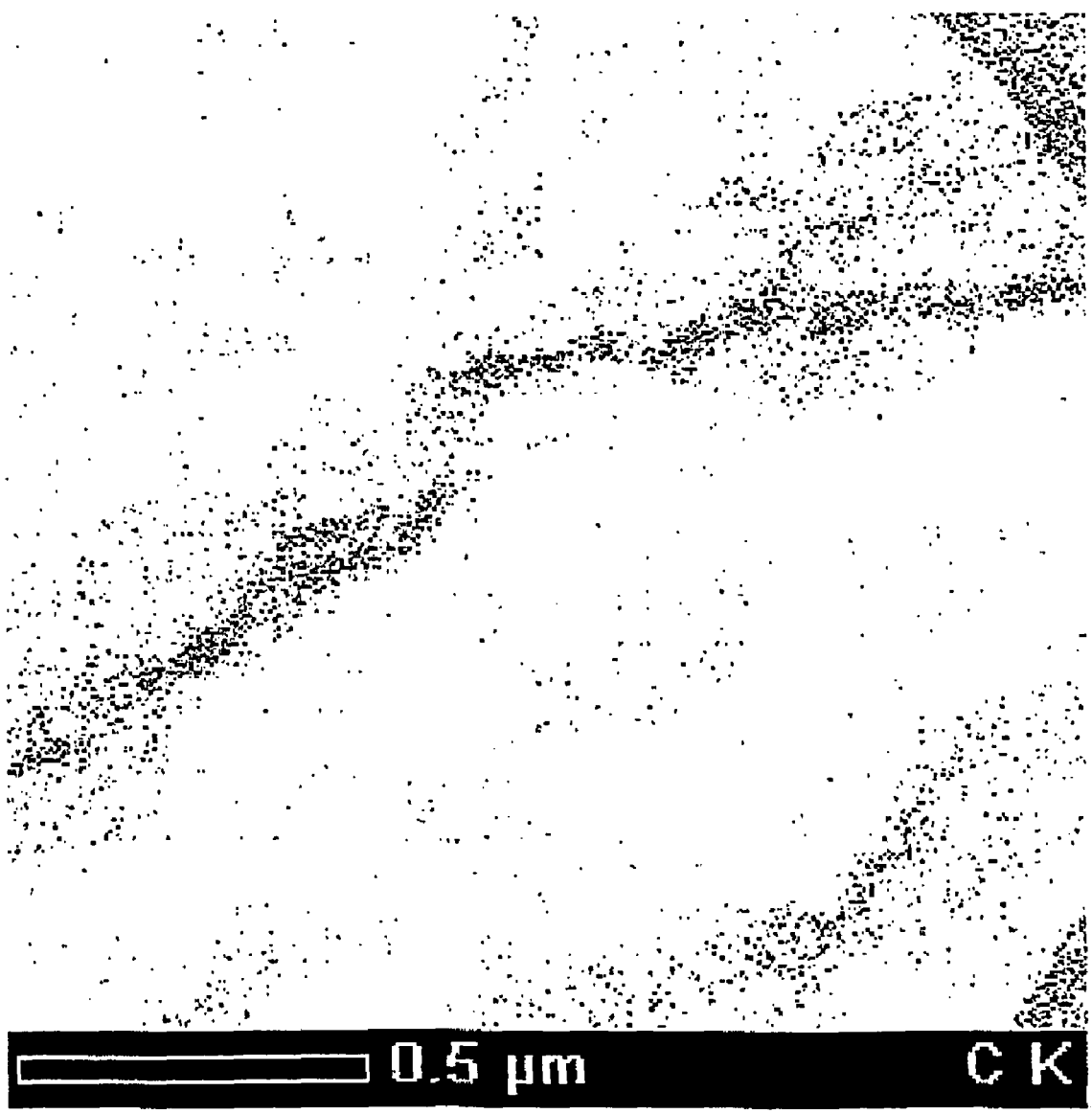
FIG. 5 shows EDS data (carbon) on a carbon-based material obtained in an example according to the invention.
Figure 6:
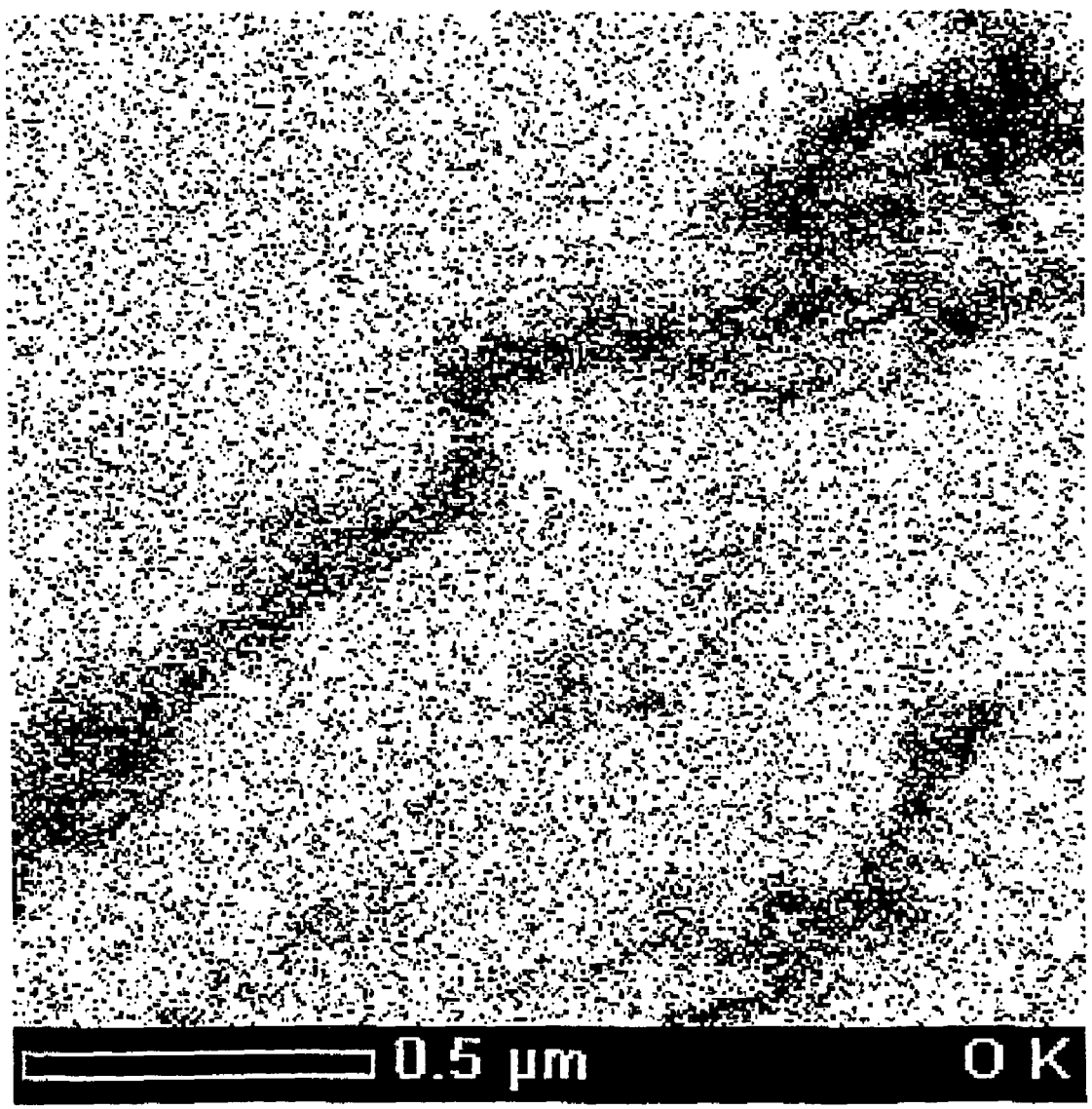
FIG. 6 shows EDS data (oxygen) on a carbon-based material obtained in an example according to the invention.
Figure 7:
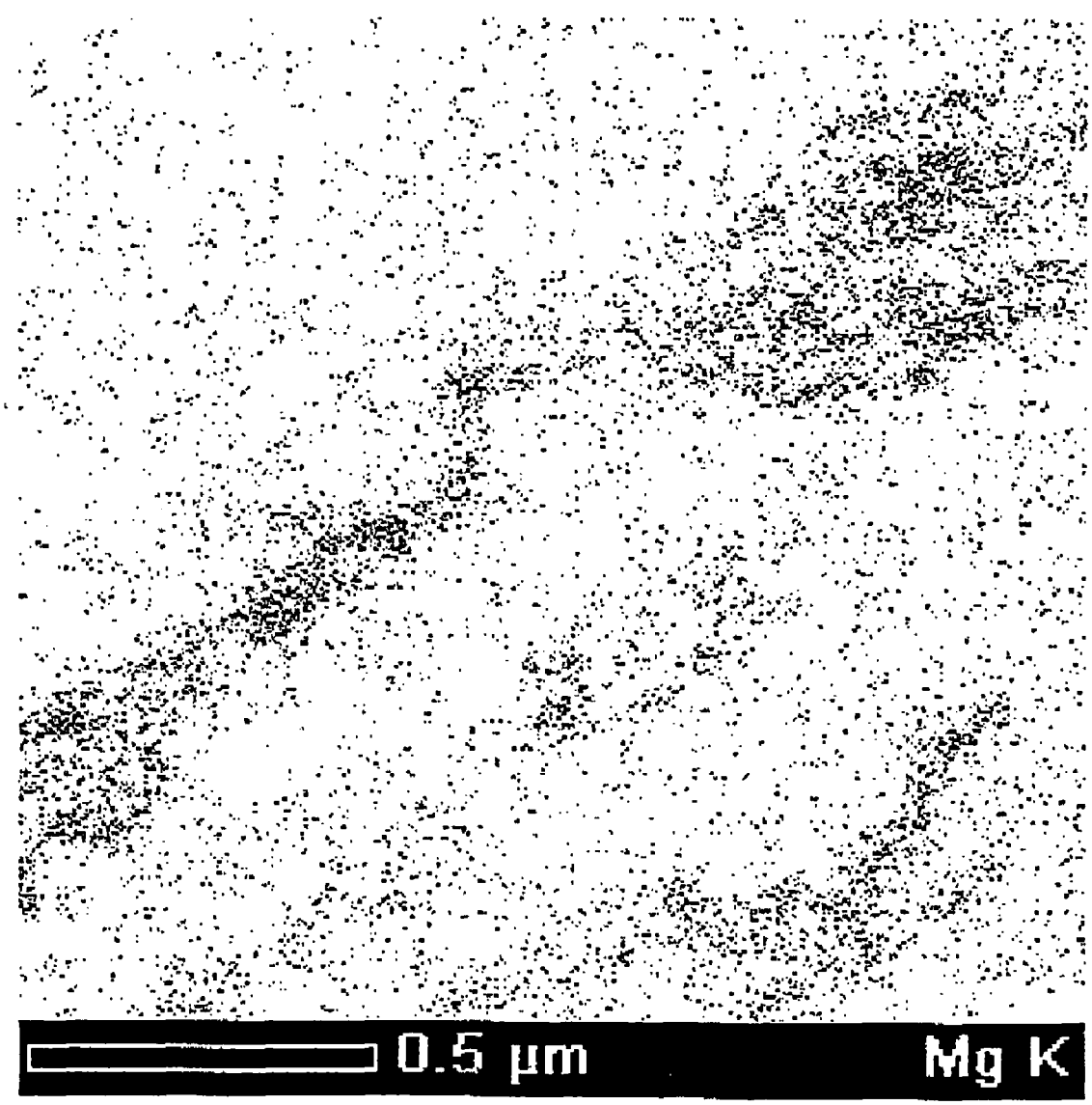
FIG. 7 shows EDS data (magnesium) on a carbon-based material obtained in an example according to the invention.

Table 1 shows energy dispersive X-ray spectroscopy (EDS) analysis results of 5 the composite metal materials obtained by (c) in Examples 1 to 3. In Table 1, the case where the presence of magnesium was confirmed around the carbon-based material is indicated as "Mg", and the case where the presence of magnesium was not confirmed is indicated as "none". FIGS. 5, 6, and 7 show EPS da on the carbon-based material of Example 1. FIGS. 5 to 7 show image data obtained by the EDS analysis. Since the presence or absence of elements is unclear in the black-and-white image, negative-positive inversion processing was performed. The black area in FIG. 5 indicates the presence of carbon, that is, the carbon nanofiber used as the first carbon material. The black area in FIG. 6 indicates the presence of oxygen. The black (dark) area in FIG. 7 indicates the presence of magnesium.

(6) Measurement of Compressive Yield Strength

A 10×10 mm sample with a thickness of 5 mm was prepared from each of the composite metal materials obtained by (c) in Examples 1 to 3 and the aluminum ingot of Comparative Example 1. The 0.2% yield strength (s0.2) when compressing the sample at 0.01 mm/min was measured. The maximum value, minimum value, and mean value (MPa) of the compressive yield strength were determined. The results are shown in Table 1.

element Y, the metal material Z, and the carbon nanofibers. The fraction (fnn/150° C.) of the composite elastomer containing the substance including the element Y, the metal material Z, and the carbon nanofibers is smaller than that of the raw material elastomer. These results suggest that the carbon nanofibers are uniformly dispersed in the composite elastomer according to the example.

Since the flow temperature of the composite elastomer containing the substance including the element Y, the metal material Z, and the carbon nanofibers is 20° C. or more higher than that of the raw material elastomer, it is understood that the composite elastomer has a small temperature dependence of dynamic viscoelasticity and exhibits excellent thermal resistance.

As a result of electron microscope (SEM) observation of the dispersion state of the carbon nanofibers in the composite metal materials of Examples 1 to 3, aggregation of the carbon nanofibers was observed to only a small extent. In Comparative Examples 1 and 2, since the carbon nanofibers were not used and the materials were not cast, microscope observation was omitted ("-" in Table 1).

(7) Differential Scanning Calorimetry (DSC)

Figure 8:
FIG. 8 is a field emission scanning electron microscope photograph of a composite metal material obtained in an example according to the invention after sublimation of aluminum.

The composite metal material obtained by (c) in Example 1 was subjected to vacuum sublimation at about 1100° C. As a result, a part of the matrix sublimed. FIG. 8 is a photograph of the composite metal material after vacuum sublimation taken by using a field emission scanning electron microscope.

TABLE 1

| | | Example 1 | Example 2 | Example 3 | Comparative Example 1 | Comparative Example 2 |
|---|---|---|---|---|---|---|
| Raw material elastomer | Polymer substance | Natural rubber (NR) | EPDM | NBR | — | — |
| | Polar group | Double bond | Double bond Norbornene | Nitrile group | — | — |
| | Avenge molecular weight | 3,000,000 | 200,000 | 3,000,000 | — | — |
| | T2n (30° C.) (μsec) | 700 | 520 | 300 | — | — |
| | T2n (150° C.) (μsec) | 5500 | 2200 | 1780 | — | — |
| | T2nn (150° C.) (μsec) | 18000 | 16000 | 13700 | — | — |
| | fnn (150° C.) | 0.381 | 0.405 | 0.133 | — | — |
| | Flow temperature (° C.) | 40 | 55 | 80 | — | — |
| Amount | Polymer (phr) | 100 | 100 | 100 | — | 0 |
| | Aluminum particle (phr) | 500 | 500 | 500 | (100) | — |
| | Magnesium particle (phr) | 2 | 2 | 2 | — | — |
| | CNT (phr) | 10 | 10 | 10 | — | 100 |
| Composite elastomer (uncrosslinked sample) | Flow temperature (° C.) | 150° C. or higher | 150° C. or higher | 150° C. or higher | — | — |
| | T2n (150° C.) (μsec) | 1640 | 1550 | 1120 | — | — |
| | T2nn (150° C.) (μsec) | None | None | None | — | — |
| | fnn (150° C.) | 0 | 0 | 0 | — | — |
| | ΔT1 (msec/CNT 1 vol %) | 16.1 | 14.0 | 15.7 | — | — |
| XPS analysis result | Heat treatment (500° C., 2 hr) | Surface oxidation | Surface oxidation | Surface oxidation | — | None |
| EDS analysis result | Magnesium on surface of carbon-based material | Mg | Mg | Mg | — | None |
| Composite metal material (aluminum matrix) | CNT content of composite metal material (vol %) | 1.6 | 1.6 | 1.6 | 0 | 100 |
| | CNT dispersion state (SEM) | Good | Good | Good | — | — |
| | Compressive yield strength maximum value (MPa) | 380 | 525 | 650 | 45 | — |
| | Compressive yield strength minimum value (MPa) | 280 | 430 | 520 | 36 | — |
| | Compressive yield strength mean value (MPa) | 320 | 480 | 580 | 40 | — |

From the results shown in Table 1, the following items were confirmed by Examples 1 to 3 according to the invention. Specifically, the spin-spin relaxation time at 150° C. (T2n/150° C.) of the composite elastomer containing the substance including the element Y, the metal material Z, and the carbon nanofibers are shorter than those of the raw material elastomer which does not contain the substance including the The amount of substance which remained without being sublimed by vacuum sublimation was about 40 wt % of the composite metal material. As a result of differential scanning calorimetry (DSC) analysis of the composite metal material of Example 1, the amount of aluminum melted was about 64 wt %, and the amount of aluminum unmelted was about 36 wt %. Therefore, it was found that the substance which was sublimed by vacuum sublimation was aluminum, and the substance which was not sublimed was the carbon nanofibers and the peripheral phase.

(8) X-Ray Diffraction Analysis of Crystal Structure

The composite metal material obtained by (c) in Example 1 was subjected to 1o crystal structure analysis by X-ray difraction (XRD). It was found that most of the components detected as the crystal components were aluminum, and the peripheral phase accounting for about 40 wt % of the composite metal material in (7) was an amorphous phase having no crystal structure.

(9) Elemental Analysis by Field Emission Scanning Electron Microscope

Figure 9:
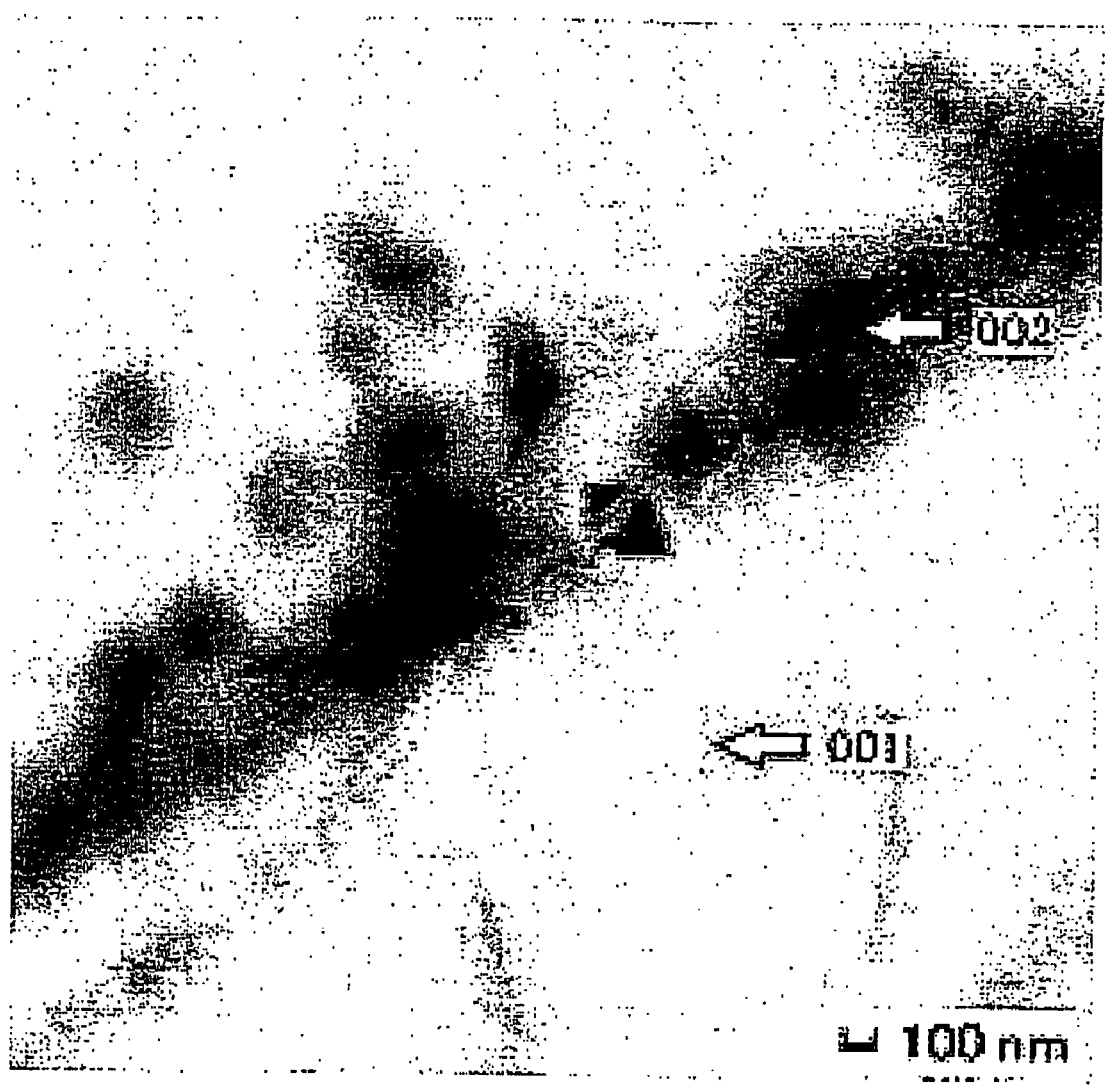
FIG. 9 shows a reflection electron image of a composite metal material obtained in an example according to the invention taken by using a field emission scanning electron microscope.
Figure 10:
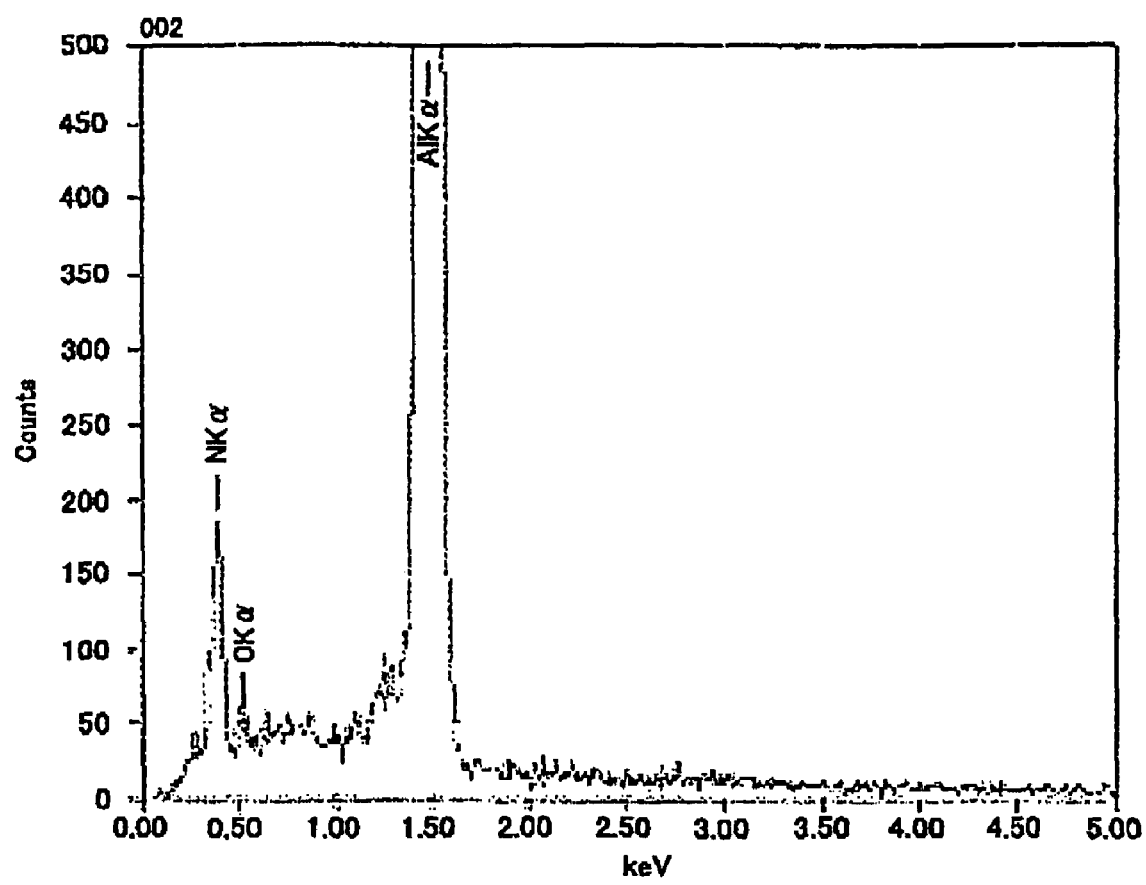
FIG. 10 shows elemental analysis results at a point 002 shown in FIG. 9.
Figure 11:
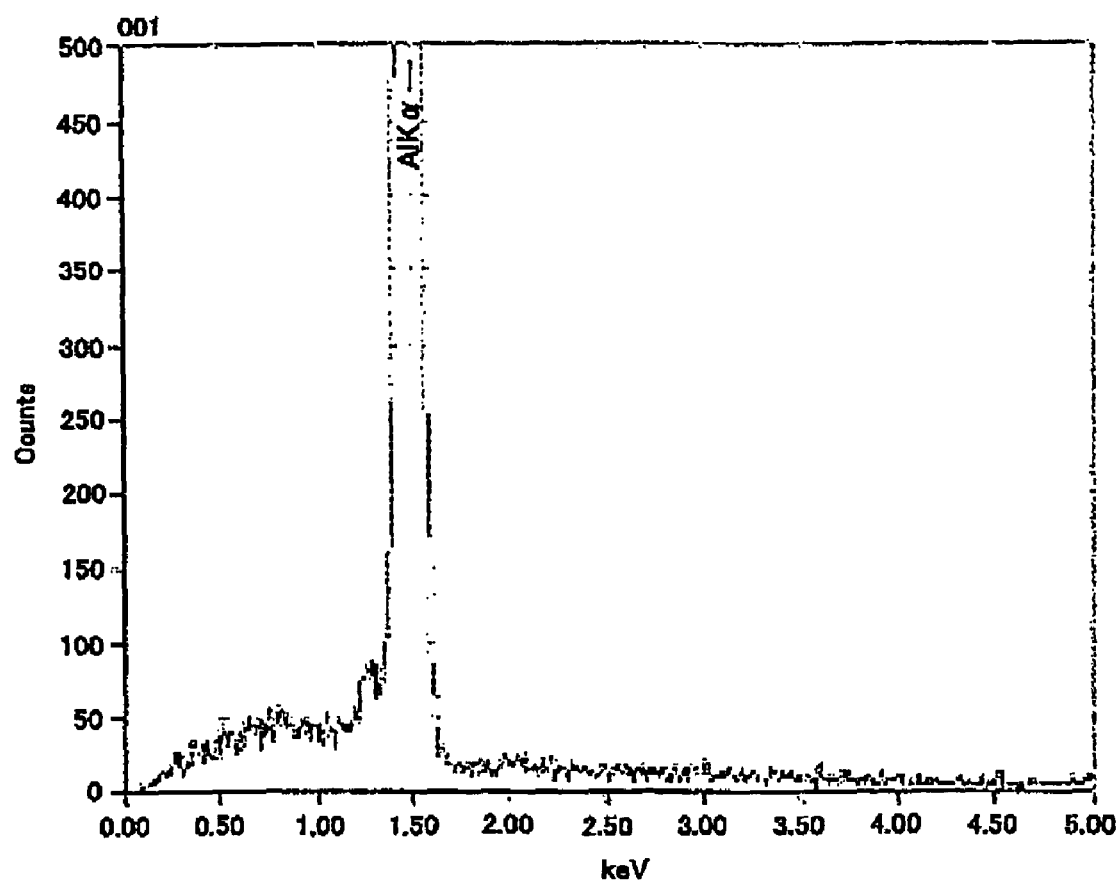
FIG. 11 shows elemental analysis results at a point 001 shown in FIG. 9.

The composite metal material obtained by (c) in Example 1 was observed by using a field emission scanning electron microscope (FE-SEM) and subjected to elemental analysis in the vicinity of the irradiation point. FIG. 9 shows a reflection electron image of the composite metal material taken by using the field emission scanning electron microscope. FIG. 10 shows elemental analysis results for an black area (point 002 in FIG. 9) extending from the lower loft to the upper right in FIG. 9, and FIG. 11 shows elemental analysis results for a white matrix (point 001 in FIG. 9) around the black area From the results shown in FIG. 11, it was found that the white matrix area is aluminum. It was also found that the black area shown in FIG. 9 is an amorphous peripheral phase. From the elemental analysis results shown in FIG. 10, it was found that the amorphous peripheral phase (black area) contains aluminum, nitrogen, and oxygen.

As described above, according to the invention, it was found that carbon nanofibers, which can be generally dispersed in a matrix to only a small extent, can be dispersed in a composite metal material. It was also found that a composite metal material can be obtained in which carbon nanofibers, generally exhibiting poor wettability with a matrix material, exhibit improved wettability with an aluminum matrix due to a fit bond between oxygen and the carbon atom, a second bond between magnesium and oxygen, and an amorphous peripheral phase.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A composite metal material comprising a carbon-based material in a matrix of a metal-based material,
    wherein the carbon-based material has a first bonding structure in which an element X bonds to a carbon atom on a surface of a carbon material,
    wherein the matrix includes an amorphous peripheral phase containing aluminum, nitrogen, and oxygen around the carbon-based material,
    wherein the element X is oxygen, and
    wherein the carbon material is at least one of carbon black and carbon fiber.

2. The composite metal material as defined in claim 1,
    wherein the carbon-based material has a second bonding structure in which an element Y bonds to the element X, and
    wherein the element Y includes at least one element selected from the group consisting of magnesium, aluminum, silicon, calcium, titanium, vanadium, chromium, manganese, iron, nickel, copper, zinc, and zirconium.

3. A method of producing a composite metal material, the method comprising:
    (a) mixing at least a carbon material into an elastomer and dispersing the carbon material by applying a shear force to obtain a composite elastomer;
    (b) heat-treating the composite elastomer in the presence of a substance including an element X to vaporize the elastomer included in the composite elastomer to obtain a carbon-based material; and
    (c-1) causing a molten metal material Z to permeate the carbon-based material in the presence of a substance including an element W, and solidifying the metal material Z,
    wherein:
    the carbon-based material has a first bonding structure in which the element X bonds to a carbon atom on a surface of the carbon material;
    the carbon material is at least one of carbon black and carbon fiber;
    the composite metal material comprises the carbon-based material in a matrix of a metal-based material, the matrix including an amorphous peripheral phase containing aluminum, nitrogen, and oxygen around the carbon-based material;
    the element X is oxygen; and
    the element W is at least one of nitrogen and oxygen.

4. The method of producing a composite metal material as defined in claim 3,
    wherein the composite elastomer includes the substance including the element X, and
    wherein the element X bonds to carbon of the carbon material by the heat treatment in the step (b).

5. The method of producing a composite metal material as defined in claim 3,
    wherein the step (b) is performed in an atmosphere containing the substance including the element X so that the element X bonds to carbon of the carbon material.

6. The method of producing a composite metal material as defined in claim 3, the method comprising:
    (b') heat-treating the carbon-based material obtained by the step (b) together with a substance including an element Y and having a melting point lower than a melting point of the carbon material to vaporize the substance including the element Y so that the element Y bonds to the element X.

7. The method of producing a composite metal material as defined in claim 3,
    wherein the metal material Z is aluminum or magnesium, and
    wherein the substance containing the element Y includes at least one element selected from the group consisting of magnesium, aluminum, silicon, calcium, titanium, vanadium, chromium, manganese, iron, nickel, copper, zinc, and zirconium.

8. The method of producing a composite metal material as defined in claim 3, wherein the carbon material is carbon black.

9. The method of producing a composite metal material as defined in claim 3, wherein the carbon material is carbon fiber.

10. The method of producing a composite metal material as defined in claim 9, wherein the carbon fiber is carbon nanofiber.

11. The method of producing a composite metal material as defined in claim 10, wherein the carbon nanofibers have an average diameter of 0.5 to 500nm.

12. The method of producing a composite metal material as defined in claim 3, wherein the elastomer has a molecular weight of 5,000 to 5,000,000.

13. The method of producing a composite metal material as defined in claim 3,
wherein at least one of a main chain, a side chain, and a terminal chain of the elastomer includes at least one unsaturated bond or group having affinity to carbon nanofiber and selected from the group consisting of a double bond, a triple bond, a hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

14. The method of producing a composite metal material as defined in claim 3, wherein the elastomer is natural rubber or nitrile butadiene rubber.

15. The method of producing a composite metal material as defined in claim 3,
wherein the step (a) is performed by using an open roll method with a roll interval of 0.5 mm or less.

16. The method of producing a composite metal material as defined in claim 3, wherein the step (a) is performed by using an internal mixing method.

17. The method of producing a composite metal material as defined in claim 3, wherein the step (a) is performed by using a multi-screw extrusion mixing method.

18. The method of producing a composite metal material as defined in claim 3, wherein the step (a) is performed at 0 to 50° C.

19. A composite metal material obtained by a method comprising:
(a) mixing at least a carbon material into an elastomer and dispersing the carbon material by applying a shear force to obtain a composite elastomer;
(b) heat-treating the composite elastomer in the presence of a substance including an element X to vaporize the elastomer included in the composite elastomer to obtain a carbon-based material; and
(c-1) causing a molten metal material Z to permeate the carbon-based material in the presence of a substance including an element W, and solidifying the metal material Z;
wherein:
the carbon-based material has a first bonding structure in which the element X bonds to a carbon atom on a surface of the carbon material;
the carbon material is at least one of carbon black and carbon fiber;
the element X is oxygen;
the element W is at least one of nitrogen and oxygen; and
the composite metal material comprises the carbon-based material in a matrix of a metal-based material, the matrix including an amorphous peripheral phase containing aluminum, nitrogen, and oxygen around the carbon-based material.

20. A method of producing a composite metal material, the method comprising:
(a) mixing at least a carbon material into an elastomer and dispersing the carbon material by applying a shear force to obtain a composite elastomer;
(b) heat-treating the composite elastomer in the presence of a substance including an element X to vaporize the elastomer included in the composite elastomer to obtain a carbon-based material; and
(c-2) powder forming the carbon-based material together with a metal material Z in the presence of a substance containing an element W,
wherein:
the carbon-based material has a first bonding structure in which the element X bonds to a carbon atom on a surface of the carbon material;
the carbon material is at least one of carbon black and carbon fiber;
the composite metal material comprises the carbon-based material in a matrix of a metal-based material, the matrix including an amorphous peripheral phase containing aluminum, nitrogen, and oxygen around the carbon-based material;
the element X is oxygen; and
the element W is at least one of nitrogen and oxygen.

21. The method of producing a composite metal material as defined in claim 20,
wherein the composite elastomer includes the substance including the element X, and
wherein the element X bonds to carbon of the carbon material by the heat treatment in step (b).

22. The method of producing a composite metal material as defined in claim 20,
wherein the step (b) is performed in an atmosphere containing the substance including the element X so that the element X bonds to carbon of the carbon material.

23. The method of producing a composite metal material as defined in claim 20, the method comprising:
(b') heat-treating the carbon-based material obtained by the step (b) together with a substance including an element Y and having a melting point lower than a melting point of the carbon material to vaporize the substance including the element Y so that the element Y bonds to the element X.

24. The method of producing a composite metal material as defined in claim 20,
wherein the metal material Z is aluminum or magnesium, and
wherein the substance including the element Y includes at least one element selected from the group consisting of magnesium, aluminum, silicon, calcium, titanium, vanadium, chromium, manganese, iron, nickel, copper, zinc, and zirconium.

25. The method of producing a composite metal material as defined in claim 20, wherein the carbon material is carbon black.

26. The method of producing a composite metal material as defined in claim 20, wherein the carbon material is carbon fiber.

27. The method of producing a composite metal material as defined in claim 26, wherein the carbon fiber is carbon nanofiber.

28. The method of producing a composite metal material as defined in claim 27, wherein the carbon nanofibers have an average diameter of 0.5 to 500 nm.

29. The method of producing a composite metal material as defined in claim 20, wherein the elastomer has a molecular weight of 5,000 to 5,000,000.

30. The method of producing a composite metal material as defined in claim 20,
wherein at least one of a main chain, a side chain, and a terminal chain of the elastomer includes at least one unsaturated bond or group having affinity to carbon nanofiber and selected from the group consisting of a double bond, a triple bond, a hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group.

31. The method of producing a composite metal material as defined in claim 20, wherein the elastomer is natural rubber or nitrile butadiene rubber.

32. The method of producing a composite metal material as defined in claim 20,
wherein the step (a) is performed by using an open roll method with a roll interval of 0.5 mm or less.

33. The method of producing a composite metal material as defined in claim 20, wherein the step (a) is performed by using an internal mixing method.

34. The method of producing a composite metal material as defined in claim 20, wherein the step (a) is performed by using a multi-screw extrusion method.

35. The method of producing a composite metal material as defined in claim 20, wherein the step (a) is performed at 0 to 50° C.

36. A composite metal material obtained by a method comprising:
(a) mixing at least a carbon material into an elastomer and dispersing the carbon material by applying a shear force to obtain a composite elastomer;
(b) heat-treating the composite elastomer in the presence of a substance including an element X to vaporize the elastomer included in the composite elastomer to obtain a carbon-based material; and
(c-2) powder forming the carbon-based material together with a metal material Z in the presence of a substance containing an element W;
wherein:
the carbon-based material has a first bonding structure in which the element X bonds to a carbon atom on a surface of the carbon material;
the carbon material is at least one of carbon black and carbon fiber;
the element X is oxygen;
the element W is nitrogen and/or oxygen; and
the composite metal material comprises the carbon-based material in a matrix of a metal-based material, the matrix including an amorphous peripheral phase containing aluminum, nitrogen, and oxygen around the carbon-based material.

37. A caliper body for a vehicular disk brake, the caliper body being formed by using a material including the composite metal material as defined in claim 1.

38. A bracket for a vehicular disk brake, the bracket being formed by using a material including the composite metal material as defined in claim 1.

39. A disk rotor for a vehicular disk brake, the disk rotor being formed by using a material including the composite metal material as defined in claim 1.

40. A brake drum for a vehicular drum brake, the brake drum being formed by using a material including the composite metal material as defined in claim 1.

41. An automotive knuckle, the automotive knuckle being formed by using a material including the composite metal material as defined in claim 1.

* * * * *